(12) United States Patent
Vainstein et al.

(10) Patent No.: US 7,921,450 B1
(45) Date of Patent: Apr. 5, 2011

(54) SECURITY SYSTEM USING INDIRECT KEY GENERATION FROM ACCESS RULES AND METHODS THEREFOR

(76) Inventors: Klimenty Vainstein, Morgan Hill, CA (US); Hal S. Hildebrand, Moss Beach, CA (US)

( * ) Notice: Subject to any disclaimer, the term of this patent is extended or adjusted under 35 U.S.C. 154(b) by 1017 days.

(21) Appl. No.: 10/295,363

(22) Filed: Nov. 15, 2002

Related U.S. Application Data

(63) Continuation-in-part of application No. 10/246,079, filed on Sep. 17, 2002, which is a continuation-in-part of application No. 10/075,194, filed on Feb. 12, 2002.

(60) Provisional application No. 60/339,634, filed on Dec. 12, 2001.

(51) Int. Cl.
*G06F 17/00* (2006.01)
(52) U.S. Cl. .................. 726/1; 726/2; 380/285; 713/189
(58) Field of Classification Search .................. 726/1–6, 726/21, 26–27; 713/182, 189, 193; 380/277, 380/285; 707/9–10; 709/225–226
See application file for complete search history.

(56) References Cited

U.S. PATENT DOCUMENTS

| | | | |
|---|---|---|---|
| 4,203,166 A | 5/1980 | Eshram et al. | |
| 4,238,854 A | 12/1980 | Ehrsam et al. | |
| 4,423,387 A | 12/1983 | Sempel | |
| 4,734,568 A | 3/1988 | Watanabe | |
| 4,757,533 A | 7/1988 | Allen et al. | |
| 4,796,220 A | 1/1989 | Wolfe | |
| 4,799,258 A | 1/1989 | Davies | |
| 4,827,508 A | 5/1989 | Shear | |
| 4,887,204 A | 12/1989 | Johnson et al. | |
| 4,888,800 A | 12/1989 | Marshall et al. | |
| 4,912,552 A | 3/1990 | Allison et al. | |
| 4,972,472 A | 11/1990 | Brown et al. | |
| 5,032,979 A | 7/1991 | Hecht et al. | |

(Continued)

FOREIGN PATENT DOCUMENTS

EP 0 672 991 A2 9/1995

(Continued)

OTHER PUBLICATIONS

Boneh, D. and Franklin M., "Identity-Based Encryption from the Weil Pairing", Crypto 2001, http://eprint.iacr.org/2001/090, Oct. 2001.*

(Continued)

*Primary Examiner* — Edan Orgad
*Assistant Examiner* — Yin-Chen Shaw
(74) *Attorney, Agent, or Firm* — Sterne Kessler Goldstein & Fox PLLC

(57) ABSTRACT

Improved system and approaches for centralized storage of access restrictions which are associated with public keys are disclosed. The access restrictions serve to limit access to files secured by a security system. According to one aspect of the present invention, identifiers, or encoded versions thereof, are used as public keys to identify particular access restrictions. The identifiers to the access restrictions are used in a decentralized manner for public keys, while the access restrictions themselves are maintained in a centralized manner. As compared to the access restrictions, the public keys based on identifiers tend to be smaller and more uniform in size. The centralized storage of the access restrictions also facilitates subsequent changes to access restrictions for previously secured files. The improved system and approaches is particularly suitable in an enterprise environment.

38 Claims, 18 Drawing Sheets

U.S. PATENT DOCUMENTS

| | | | |
|---|---|---|---|
| 5,052,040 A | 9/1991 | Preston et al. | |
| 5,058,164 A | 10/1991 | Elmer et al. | |
| 5,144,660 A | 9/1992 | Rose | |
| 5,204,897 A | 4/1993 | Wyman | |
| 5,212,788 A | 5/1993 | Lomet et al. | |
| 5,220,657 A | 6/1993 | Bly et al. | |
| 5,235,641 A | 8/1993 | Nozawa et al. | |
| 5,247,575 A | 9/1993 | Sprague et al. | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,434,918 A | 7/1995 | Kung et al. | |
| 5,461,710 A | 10/1995 | Bloomfield et al. | |
| 5,467,342 A | 11/1995 | Logston et al. | |
| 5,495,533 A | 2/1996 | Linehan et al. | |
| 5,497,422 A | 3/1996 | Tysen et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,619,576 A * | 4/1997 | Shaw | 380/44 |
| 5,638,501 A | 6/1997 | Gough et al. | |
| 5,640,388 A | 6/1997 | Woodhead et al. | |
| 5,655,119 A | 8/1997 | Davy | |
| 5,661,668 A | 8/1997 | Yemini et al. | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,682,537 A | 10/1997 | Davies et al. | |
| 5,684,987 A | 11/1997 | Mamiya et al. | |
| 5,689,688 A | 11/1997 | Strong et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,719,941 A | 2/1998 | Swift et al. | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,745,750 A | 4/1998 | Porcaro | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Erickson | |
| 5,768,381 A | 6/1998 | Hawthorne | |
| 5,778,065 A | 7/1998 | Hauser et al. | |
| 5,778,350 A | 7/1998 | Adams et al. | |
| 5,781,711 A | 7/1998 | Austin et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,850,443 A | 12/1998 | Van Oorschot et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A * | 8/1999 | Schneck et al. | 705/54 |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,978,802 A | 11/1999 | Hurvig | |
| 5,987,440 A | 11/1999 | O'Neil et al. | |
| 5,991,879 A | 11/1999 | Still | |
| 5,999,907 A | 12/1999 | Donner | |
| 6,011,847 A * | 1/2000 | Follendore, III | 713/160 |
| 6,014,730 A | 1/2000 | Ohtsu | |
| 6,023,506 A | 2/2000 | Ote et al. | |
| 6,031,584 A | 2/2000 | Gray | |
| 6,032,216 A | 2/2000 | Schmuck et al. | |
| 6,035,404 A | 3/2000 | Zhao | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,957 A | 5/2000 | Richards | |
| 6,070,244 A | 5/2000 | Orchier et al. | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,148,338 A | 11/2000 | Lachelt et al. | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,199,070 B1 | 3/2001 | Polo-Wood et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,755 B1 | 6/2001 | Yemini et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,266,420 B1 | 7/2001 | Langford et al. | |
| 6,272,631 B1 | 8/2001 | Thomlinson et al. | |
| 6,272,632 B1 * | 8/2001 | Carman et al. | 713/168 |
| 6,282,649 B1 | 8/2001 | Lambert et al. | |
| 6,289,450 B1 | 9/2001 | Pensak et al. | |
| 6,289,458 B1 | 9/2001 | Garg et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,299,069 B1 | 10/2001 | Shona | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,408 B1 | 11/2001 | Salas et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |

| Patent | Date | Inventor |
|---|---|---|
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,385,644 B1 | 5/2002 | Devine et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,476 B1 | 10/2002 | Wong et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 * | 4/2003 | Sims, III ............ 713/193 |
| 6,557,039 B1 | 4/2003 | Leong et al. |
| 6,567,914 B1 | 5/2003 | Just et al. |
| 6,571,291 B1 | 5/2003 | Chow |
| 6,574,733 B1 | 6/2003 | Langford |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,601,170 B1 * | 7/2003 | Wallace, Jr. ............ 713/168 |
| 6,603,857 B1 | 8/2003 | Batten-Carew et al. |
| 6,608,636 B1 | 8/2003 | Roseman |
| 6,611,599 B2 | 8/2003 | Natarajan |
| 6,615,349 B1 | 9/2003 | Hair |
| 6,615,350 B1 * | 9/2003 | Schell et al. ............ 713/168 |
| 6,625,650 B2 | 9/2003 | Stelliga |
| 6,625,734 B1 * | 9/2003 | Marvit et al. ............ 726/28 |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 * | 11/2003 | Numao et al. ............ 707/9 |
| 6,678,835 B1 | 1/2004 | Shah et al. |
| 6,687,822 B1 | 2/2004 | Jakobsson |
| 6,693,652 B1 | 2/2004 | Barrus et al. |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Futagami et al. |
| 6,775,779 B1 | 8/2004 | England et al. |
| 6,779,031 B1 | 8/2004 | Picher-Dempsey |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 | 3/2005 | Krueger et al. |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 | 7/2005 | Kuroda et al. |
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,938,156 B2 * | 8/2005 | Wheeler et al. ............ 713/170 |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 * | 10/2005 | Lortz ............ 709/226 |
| 6,959,308 B2 * | 10/2005 | Gramsamer et al. ............ 707/200 |
| 6,961,849 B1 | 11/2005 | Davis et al. |
| 6,961,855 B1 | 11/2005 | Rich et al. |
| 6,968,060 B1 * | 11/2005 | Pinkas ............ 380/277 |
| 6,968,456 B1 | 11/2005 | Tripathi et al. |
| 6,971,018 B1 | 11/2005 | Witt et al. |
| 6,976,259 B1 | 12/2005 | Dutta et al. |
| 6,978,366 B1 | 12/2005 | Ignatchenko et al. |
| 6,978,376 B2 * | 12/2005 | Giroux et al. ............ 713/189 |
| 6,978,377 B1 | 12/2005 | Asano et al. |
| 6,987,752 B1 | 1/2006 | Sarraf et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,000,150 B1 | 2/2006 | Zunino et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B2 | 5/2006 | Doonan et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 * | 7/2006 | Nonaka et al. ............ 713/193 |
| 7,076,067 B2 | 7/2006 | Raike et al. |
| 7,076,312 B2 | 7/2006 | Law et al. |

| Patent | Date | Name | | Patent | Date | Name |
|---|---|---|---|---|---|---|
| 7,076,469 B2 | 7/2006 | Schreiber et al. | | 7,512,810 B1 | 3/2009 | Ryan |
| 7,076,633 B2 | 7/2006 | Tormasov et al. | | 7,539,867 B2 | 5/2009 | Bolosky et al. |
| 7,080,077 B2 | 7/2006 | Ramamurthy et al. | | 7,555,558 B1 | 6/2009 | Kenrich et al. |
| 7,095,853 B2 | 8/2006 | Morishita | | 7,562,232 B2 | 7/2009 | Zuili et al. |
| 7,096,266 B2 | 8/2006 | Lewin et al. | | 7,565,683 B1 | 7/2009 | Huang et al. |
| 7,099,926 B1 | 8/2006 | Ims et al. | | 7,631,184 B2 | 12/2009 | Ryan |
| 7,103,911 B2* | 9/2006 | Spies et al. .................. 726/3 | | 7,681,034 B1 | 3/2010 | Lee et al. |
| 7,107,185 B1 | 9/2006 | Yemini et al. | | 7,698,230 B1 | 4/2010 | Brown et al. |
| 7,107,269 B2 | 9/2006 | Arlein et al. | | 7,702,909 B2 | 4/2010 | Vainstein |
| 7,107,416 B2 | 9/2006 | Stuart et al. | | 7,703,140 B2 | 4/2010 | Nath et al. |
| 7,113,594 B2* | 9/2006 | Boneh et al. ............... 380/28 | | 7,707,427 B1 | 4/2010 | Kenrich et al. |
| 7,116,785 B2 | 10/2006 | Okaue | | 7,729,995 B1 | 6/2010 | Alain et al. |
| 7,117,322 B2 | 10/2006 | Hochberg et al. | | 7,730,543 B1 | 6/2010 | Nath et al. |
| 7,120,635 B2 | 10/2006 | Bhide et al. | | 7,748,045 B2 | 6/2010 | Kenrich et al. |
| 7,120,757 B2 | 10/2006 | Tsuge | | 2001/0000265 A1 | 4/2001 | Schreiber et al. |
| 7,124,164 B1 | 10/2006 | Chemtob | | 2001/0011254 A1* | 8/2001 | Clark .......................... 705/59 |
| 7,126,957 B1 | 10/2006 | Isukapalli et al. | | 2001/0018743 A1* | 8/2001 | Morishita .................... 713/193 |
| 7,130,964 B2 | 10/2006 | Ims et al. | | 2001/0021255 A1 | 9/2001 | Ishibashi |
| 7,131,071 B2 | 10/2006 | Gune et al. | | 2001/0021926 A1 | 9/2001 | Schneck et al. |
| 7,134,041 B2 | 11/2006 | Murray et al. | | 2001/0023421 A1 | 9/2001 | Numao et al. |
| 7,136,903 B1 | 11/2006 | Phillips et al. | | 2001/0032181 A1 | 10/2001 | Jakstadt et al. |
| 7,139,399 B1 | 11/2006 | Zimmermann | | 2001/0033611 A1 | 10/2001 | Grimwood et al. |
| 7,140,044 B2 | 11/2006 | Redlich et al. | | 2001/0034839 A1 | 10/2001 | Karjoth et al. |
| 7,145,898 B1 | 12/2006 | Elliott | | 2001/0042110 A1 | 11/2001 | Furusawa et al. |
| 7,146,388 B2 | 12/2006 | Stakutis et al. | | 2001/0044903 A1 | 11/2001 | Yamamoto et al. |
| 7,146,498 B1 | 12/2006 | Takechi et al. | | 2001/0056541 A1 | 12/2001 | Matsuzaki et al. |
| 7,159,036 B2 | 1/2007 | Hinchliffe et al. | | 2001/0056550 A1 | 12/2001 | Lee |
| 7,168,094 B1 | 1/2007 | Fredell | | 2002/0003886 A1 | 1/2002 | Hillegass et al. |
| 7,171,557 B2 | 1/2007 | Kallahalla et al. | | 2002/0007335 A1 | 1/2002 | Millard et al. |
| 7,174,563 B1 | 2/2007 | Brownlie et al. | | 2002/0010679 A1 | 1/2002 | Felsher |
| 7,177,427 B1 | 2/2007 | Komuro et al. | | 2002/0013772 A1 | 1/2002 | Peinado |
| 7,177,839 B1 | 2/2007 | Claxton et al. | | 2002/0016921 A1 | 2/2002 | Olsen et al. |
| 7,178,033 B1 | 2/2007 | Garcia | | 2002/0016922 A1* | 2/2002 | Richards et al. ............. 713/200 |
| 7,181,017 B1* | 2/2007 | Nagel et al. ................. 380/282 | | 2002/0023208 A1 | 2/2002 | Jancula |
| 7,185,364 B2 | 2/2007 | Knouse et al. | | 2002/0026321 A1 | 2/2002 | Faris et al. |
| 7,187,033 B2 | 3/2007 | Pendharkar | | 2002/0027886 A1 | 3/2002 | Fischer et al. |
| 7,188,181 B1 | 3/2007 | Squier et al. | | 2002/0029340 A1 | 3/2002 | Pensak et al. |
| 7,194,764 B2 | 3/2007 | Martherus et al. | | 2002/0031230 A1* | 3/2002 | Sweet et al. .................. 380/278 |
| 7,197,638 B1 | 3/2007 | Grawrock et al. | | 2002/0035624 A1 | 3/2002 | Kim |
| 7,200,747 B2 | 4/2007 | Riedel et al. | | 2002/0036984 A1 | 3/2002 | Chiussi et al. |
| 7,203,317 B2 | 4/2007 | Kallahalla et al. | | 2002/0041391 A1 | 4/2002 | Bannai |
| 7,203,968 B2 | 4/2007 | Asano et al. | | 2002/0042756 A1 | 4/2002 | Kumar et al. |
| 7,219,230 B2 | 5/2007 | Riedel et al. | | 2002/0046350 A1 | 4/2002 | Lordemann et al. |
| 7,224,795 B2 | 5/2007 | Takada et al. | | 2002/0050098 A1 | 5/2002 | Chan |
| 7,225,256 B2 | 5/2007 | Villavicencio | | 2002/0052981 A1 | 5/2002 | Yasuda |
| 7,227,953 B2 | 6/2007 | Shida | | 2002/0056042 A1 | 5/2002 | Van Der Kaay et al. |
| 7,233,948 B1 | 6/2007 | Shamoon et al. | | 2002/0062240 A1 | 5/2002 | Morinville |
| 7,237,002 B1 | 6/2007 | Estrada et al. | | 2002/0062245 A1 | 5/2002 | Niu et al. |
| 7,249,044 B2 | 7/2007 | Kumar et al. | | 2002/0062451 A1 | 5/2002 | Scheidt et al. |
| 7,249,251 B2 | 7/2007 | Todd et al. | | 2002/0069272 A1 | 6/2002 | Kim et al. |
| 7,260,555 B2 | 8/2007 | Rossmann et al. | | 2002/0069363 A1 | 6/2002 | Winburn |
| 7,265,764 B2 | 9/2007 | Alben et al. | | 2002/0073320 A1 | 6/2002 | Rinkevich et al. |
| 7,266,684 B2 | 9/2007 | Jancula | | 2002/0077986 A1 | 6/2002 | Kobata et al. |
| 7,280,658 B2 | 10/2007 | Amini et al. | | 2002/0077988 A1 | 6/2002 | Sasaki et al. |
| 7,281,272 B1 | 10/2007 | Rubin et al. | | 2002/0078361 A1 | 6/2002 | Giroux et al. |
| 7,287,055 B2 | 10/2007 | Smith et al. | | 2002/0089602 A1 | 7/2002 | Sullivan |
| 7,287,058 B2 | 10/2007 | Loveland et al. | | 2002/0091532 A1 | 7/2002 | Viets et al. |
| 7,290,148 B2 | 10/2007 | Tozawa et al. | | 2002/0091745 A1 | 7/2002 | Ramamurthy et al. |
| 7,308,702 B1 | 12/2007 | Thomsen et al. | | 2002/0091928 A1 | 7/2002 | Bouchard et al. |
| 7,313,824 B1 | 12/2007 | Bala et al. | | 2002/0093527 A1 | 7/2002 | Sherlock et al. |
| 7,319,752 B2 | 1/2008 | Asano et al. | | 2002/0099947 A1 | 7/2002 | Evans |
| 7,340,600 B1 | 3/2008 | Corella | | 2002/0112035 A1 | 8/2002 | Carey et al. |
| 7,359,517 B1 | 4/2008 | Rowe | | 2002/0120851 A1 | 8/2002 | Clarke |
| 7,362,868 B2 | 4/2008 | Madoukh et al. | | 2002/0124180 A1 | 9/2002 | Hagman |
| 7,380,120 B1 | 5/2008 | Garcia | | 2002/0129158 A1 | 9/2002 | Zhang et al. |
| 7,383,586 B2 | 6/2008 | Cross et al. | | 2002/0129235 A1 | 9/2002 | Okamoto et al. |
| 7,386,529 B2 | 6/2008 | Kiessig et al. | | 2002/0133500 A1* | 9/2002 | Arlein et al. .................. 707/102 |
| 7,386,599 B1 | 6/2008 | Piersol et al. | | 2002/0133699 A1 | 9/2002 | Pueschel |
| 7,401,220 B2 | 7/2008 | Bolosky et al. | | 2002/0138571 A1 | 9/2002 | Trinon et al. |
| 7,406,596 B2 | 7/2008 | Tararukhina et al. | | 2002/0138726 A1 | 9/2002 | Samson et al. |
| 7,415,608 B2 | 8/2008 | Bolosky et al. | | 2002/0143710 A1 | 10/2002 | Liu |
| 7,434,048 B1 | 10/2008 | Shapiro et al. | | 2002/0143906 A1 | 10/2002 | Tormasov et al. |
| 7,454,612 B2 | 11/2008 | Bolosky et al. | | 2002/0150239 A1 | 10/2002 | Carny et al. |
| 7,461,157 B2 | 12/2008 | Ahlard et al. | | 2002/0152302 A1 | 10/2002 | Motoyama et al. |
| 7,461,405 B2 | 12/2008 | Boudreault et al. | | 2002/0157016 A1 | 10/2002 | Russell et al. |
| 7,478,243 B2 | 1/2009 | Bolosky et al. | | 2002/0162104 A1 | 10/2002 | Raike et al. |
| 7,478,418 B2 | 1/2009 | Supramaniam et al. | | 2002/0165870 A1 | 11/2002 | Chakraborty et al. |
| 7,496,959 B2 | 2/2009 | Adelstein et al. | | 2002/0166053 A1 | 11/2002 | Wilson |
| 7,509,492 B2 | 3/2009 | Boyen et al. | | 2002/0169965 A1 | 11/2002 | Hale et al. |

| | | |
|---|---|---|
| 2002/0172367 A1 | 11/2002 | Mulder et al. |
| 2002/0174030 A1 | 11/2002 | Praisner et al. |
| 2002/0174415 A1 | 11/2002 | Hines |
| 2002/0176572 A1 | 11/2002 | Ananth |
| 2002/0184217 A1 | 12/2002 | Bisbee et al. |
| 2002/0184488 A1 | 12/2002 | Amini et al. |
| 2002/0194484 A1 | 12/2002 | Bolosky et al. |
| 2002/0198798 A1 | 12/2002 | Ludwig et al. |
| 2003/0005168 A1 | 1/2003 | Leerssen et al. |
| 2003/0014391 A1 | 1/2003 | Evans et al. |
| 2003/0026431 A1 | 2/2003 | Hammersmith |
| 2003/0028610 A1 | 2/2003 | Pearson |
| 2003/0033528 A1 | 2/2003 | Ozog et al. |
| 2003/0037029 A1 | 2/2003 | Holenstein et al. |
| 2003/0037133 A1 | 2/2003 | Owens |
| 2003/0037237 A1 | 2/2003 | Abgrall et al. |
| 2003/0046176 A1 | 3/2003 | Hynes |
| 2003/0046238 A1 | 3/2003 | Nonaka et al. |
| 2003/0046270 A1 | 3/2003 | Leung et al. |
| 2003/0050919 A1 | 3/2003 | Brown et al. |
| 2003/0051039 A1 | 3/2003 | Brown et al. |
| 2003/0056139 A1 | 3/2003 | Murray et al. |
| 2003/0061506 A1 | 3/2003 | Cooper |
| 2003/0081784 A1 | 5/2003 | Kallahalla et al. |
| 2003/0081785 A1* | 5/2003 | Boneh et al. .................. 380/277 |
| 2003/0081787 A1 | 5/2003 | Kallahalla et al. |
| 2003/0088783 A1 | 5/2003 | DiPierro |
| 2003/0095552 A1 | 5/2003 | Bernhard et al. |
| 2003/0099248 A1 | 5/2003 | Speciner |
| 2003/0101072 A1 | 5/2003 | Dick et al. |
| 2003/0110266 A1 | 6/2003 | Rollins et al. |
| 2003/0110280 A1 | 6/2003 | Hinchliffe et al. |
| 2003/0110397 A1 | 6/2003 | Supramaniam |
| 2003/0115146 A1 | 6/2003 | Lee et al. |
| 2003/0115218 A1 | 6/2003 | Bobbitt et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0132949 A1 | 7/2003 | Fallon et al. |
| 2003/0154381 A1 | 8/2003 | Ouye |
| 2003/0154396 A1 | 8/2003 | Godwin et al. |
| 2003/0154401 A1 | 8/2003 | Hartman et al. |
| 2003/0159048 A1 | 8/2003 | Matsumoto et al. |
| 2003/0159066 A1 | 8/2003 | Staw et al. |
| 2003/0163704 A1 | 8/2003 | Dick et al. |
| 2003/0165117 A1 | 9/2003 | Garcia-Luna-Aceves et al. |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182310 A1 | 9/2003 | Charnock et al. |
| 2003/0182579 A1 | 9/2003 | Leporini et al. |
| 2003/0182584 A1 | 9/2003 | Banes et al. |
| 2003/0196096 A1 | 10/2003 | Sutton |
| 2003/0197729 A1 | 10/2003 | Denoue et al. |
| 2003/0204692 A1 | 10/2003 | Tamer et al. |
| 2003/0208485 A1 | 11/2003 | Castellanos |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0220999 A1 | 11/2003 | Emerson |
| 2003/0222141 A1 | 12/2003 | Vogler et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0041845 A1 | 3/2004 | Alben et al. |
| 2004/0049702 A1 | 3/2004 | Subramaniam et al. |
| 2004/0064507 A1 | 4/2004 | Sakata et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0117371 A1 | 6/2004 | Bhide et al. |
| 2004/0131191 A1 | 7/2004 | Chen et al. |
| 2004/0133544 A1 | 7/2004 | Kiessig et al. |
| 2004/0158586 A1 | 8/2004 | Tsai |
| 2004/0186845 A1 | 9/2004 | Fukui |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0205576 A1 | 10/2004 | Chikirivao et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2004/0254884 A1 | 12/2004 | Haber et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0050098 A1 | 3/2005 | Barnett |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091289 A1 | 4/2005 | Shappell et al. |
| 2005/0091484 A1 | 4/2005 | Thornton et al. |
| 2005/0097061 A1 | 5/2005 | Shapiro et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0168766 A1 | 8/2005 | Troyansky et al. |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0268033 A1 | 12/2005 | Ogasawara et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075258 A1 | 4/2006 | Adamson et al. |
| 2006/0075465 A1 | 4/2006 | Ramanathan et al. |
| 2006/0093150 A1 | 5/2006 | Reddy et al. |
| 2006/0101285 A1 | 5/2006 | Chen et al. |
| 2006/0149407 A1 | 7/2006 | Markham et al. |
| 2006/0168147 A1 | 7/2006 | Inoue et al. |
| 2006/0184637 A1 | 8/2006 | Hultgren et al. |
| 2006/0230437 A1 | 10/2006 | Boyer et al. |
| 2006/0277316 A1 | 12/2006 | Wang et al. |
| 2007/0006214 A1 | 1/2007 | Dubal et al. |
| 2007/0067837 A1 | 3/2007 | Schuster |
| 2007/0193397 A1 | 8/2007 | Hwan |
| 2007/0294368 A1 | 12/2007 | Bomgaars et al. |
| 2008/0075126 A1 | 3/2008 | Yang |
| 2009/0254843 A1 | 10/2009 | Van Wie et al. |
| 2010/0047757 A1 | 2/2010 | McCurry et al. |
| 2010/0199088 A1 | 8/2010 | Nath |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107 504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| JP | 2006-244044 A | 9/2006 |
| JP | 2009-020720 A | 1/2009 |
| WO | WO 96/41288 A1 | 12/1996 |
| WO | WO 00/56028 | 9/2000 |

| | | | |
|---|---|---|---|
| WO | WO 01/61438 A2 | 8/2001 | |
| WO | WO 01/63387 A2 | 8/2001 | |
| WO | WO 01/63387 A3 | 8/2001 | |
| WO | WO 01/77783 A2 | 10/2001 | |
| WO | WO 01/78285 A1 | 10/2001 | |
| WO | WO 01/84271 A2 | 11/2001 | |

OTHER PUBLICATIONS

"Inside Encrypting File System," Part 1, from MSDN Oct. 2001 version, exact publication date is unknown but believed prior to Dec. 12, 2001.
"Inside Encrypting File System," Part 2, from MSDN Oct. 2001 version, exact publication date is unknown but believed prior to Dec. 12, 2001.
"Security with Encrypting File System," from MSDN Oct. 2001 version, exact publication date is unknown but believed prior to Dec. 12, 2001.
"How EFS Works," from MSDN Oct. 2001 version, exact publication date is unknown but believed prior to Dec. 12, 2001.
"Encrypting File System," from MSDN Oct. 2001 version, exact publication date is unknown but believed prior to Dec. 12, 2001.
"Features of EFS," from MSDN Oct. 2001 version, exact publication date is unknown but believed prior to Dec. 12, 2001.
"Windows 2000 EFS," in the Apr. 1999 issue of *Windows NT Magazine*.
"Expiration Mechanism for Chipcards," IBM Technical Disclosure Bulletin, Oct. 1, 2001, UK.
McDaniel et al., "Antigone: A Flexible Framework for Secure Group Communication," Proceedings of the 8th USENIX Security Symposium, Aug. 23, 1999.
Stallings, William, "Cryptography and Network Security: Principles and Practice," 1999, pp. 333-337, Second Edition, Prentice Hall, Upper Saddle River, New Jersey.
Microsoft Windows 2000 Server. Windows 2000 Group Policy White Paper, 2000.
Symantec. Norton Antivirus Corporate Edition Implementation Guide, 1999.
"Affect," The American Heritage Dictionary of the English Language, Fourth Edition, Houghton Mifflin Company, 2002. Retrieved May 4, 2006 from http://dictionary.reference.com/search?q=affect.
Crocker, Steven Toye, "Multi-level cryptographic transformations for securing digital assets,"U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment, "U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine " inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities " inventor Vainstein, Dec. 20, 2002, 39 pgs.
U.S. Appl. No. 10/286,524, entitled "Security system that uses indirect password-based encryption," inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/642,041, entitled "Method and system for fault-tolerant transfer of files across a network" inventor Kenrich, Aug. 15, 2003, 32 pgs.
U.S.Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for idnetifying compunds that inhibit or reduce PTP1B expressions" inventor Rondinone, Feb. 12, 2002, 69 pgs.
U.S.Appl. No. 10/074,804, entitled "Secured Data Format for Access Control," inventor Garcia, Feb. 12, 2002, 108 pgs.
U.S.Appl. No. 10/075,194, entitled "System and Method for Providing Multilocation Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S.Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S.Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1 -4.
Adobe Acrobat Security Settings, Acrobat 7.0, Nov. 15, 2004, pp. 1-4.
"Security Options". Dec. 20, 2001. DC & Co. pp. 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.

Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Office Action, dated May 10, 2005, for European Patent Application No. 02258532.7, 5 pgs.
Office Action, dated Dec. 5, 2006, for European Patent Application No. 02258532.7, 5 pgs.
Boneh et al., "Hierarchical Identity Based Encryption with Constant Size Ciphertext," Advances in Cryptology- EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.
Curtis et al., "Securing the Global, Remote, Mobile User," 1999 John Wiley & Sons, Ltd., Int. J. Network Mgmt. 9, pp. 9-21.
"Secure Sockets Layer (SSL): How it Works," Verisign, http://www.verisign.com/ssl/ssl-information-center/how-ssl-security-works, pp. 1-2.
"Column Archives," Microsoft TechNet, Professor Windows, technet.microsoft.com/enus/library/bb878075.aspx, retrieved on Dec. 3, 2009.
"Columns," Microsoft TechNet http://web.archive.org/web/20021014225142/www.microsoft.com/techneUcolumns/default.asp Oct. 14, 2002, Retrieved from web.archive.org on Dec. 3, 2009.
"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009.
Juvva et al. "A Real-Time Push-Pull Communications Model for Distributed Real-Time and Multimedia Systems," Jan. 1999, School of Computer Sciences Carnegie Mellon University.
"Migrating Accounts From Windows NT 4.0 Domains to Windows 2000," Microsoft TechNet—Professor Windows Apr. 2002, http://web.archive.org/web/20020415004611/www. microsoft.com/technetlcolu mns/profwin/, Apr. 15, 2002.
"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009.
"WayBack Machine" web.archive.org, http://web.archive.org/web/*/http://www.microsoft.com/technetlcolumns/profwin/, Retrieved on Dec. 3, 2009.
English language translation (unverified, machine-generated) of Japanese Patent Publication No. JP 2006-244044, Japanese Patent Office, Patent & Utility Model Gazette DB, 2006.
English language translation (unverified, machine-generated) of Japanese Patent Publication No. 2009-020720, Japanese Patent Office, Patent & Utility Model Gazette DB, 2009.
Office Action, dated Oct. 5, 2005, for European Patent Application No. 02258532.7, 5 pgs.
English language abstract for Japanese Appl. No. 2001-036517, filed Feb. 9, 2001, 1 pg.
Botha et al., "Access Control in Document-Centric Workflow Systems- An Agent-Based Approach," Computers & Security, vol. 20:6, Sep. 2001, pp. 525-532.
Botha et al., "Separation of Duties for Access Control Enforcement in Workflow Environments," IBM, 2001.

* cited by examiner

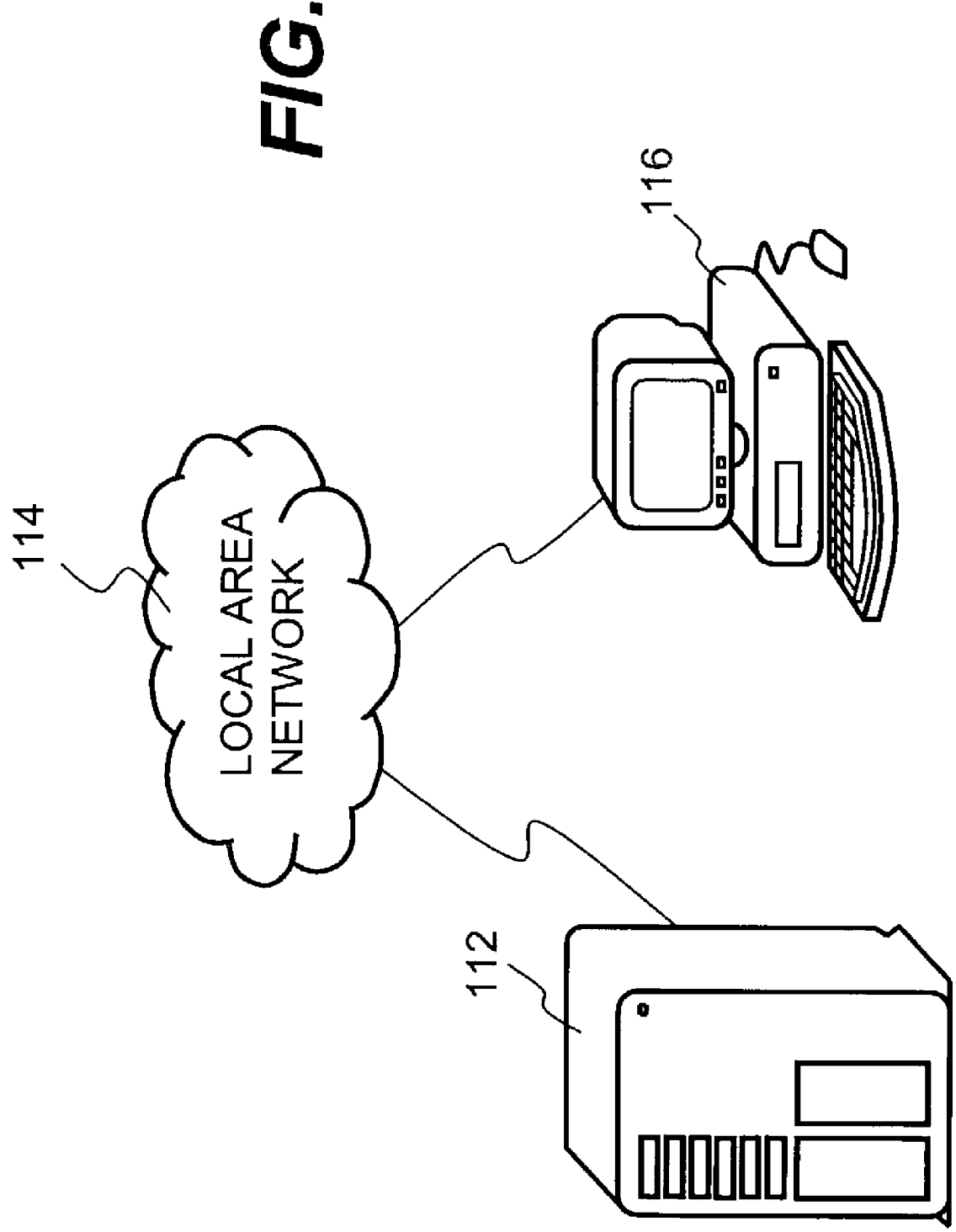

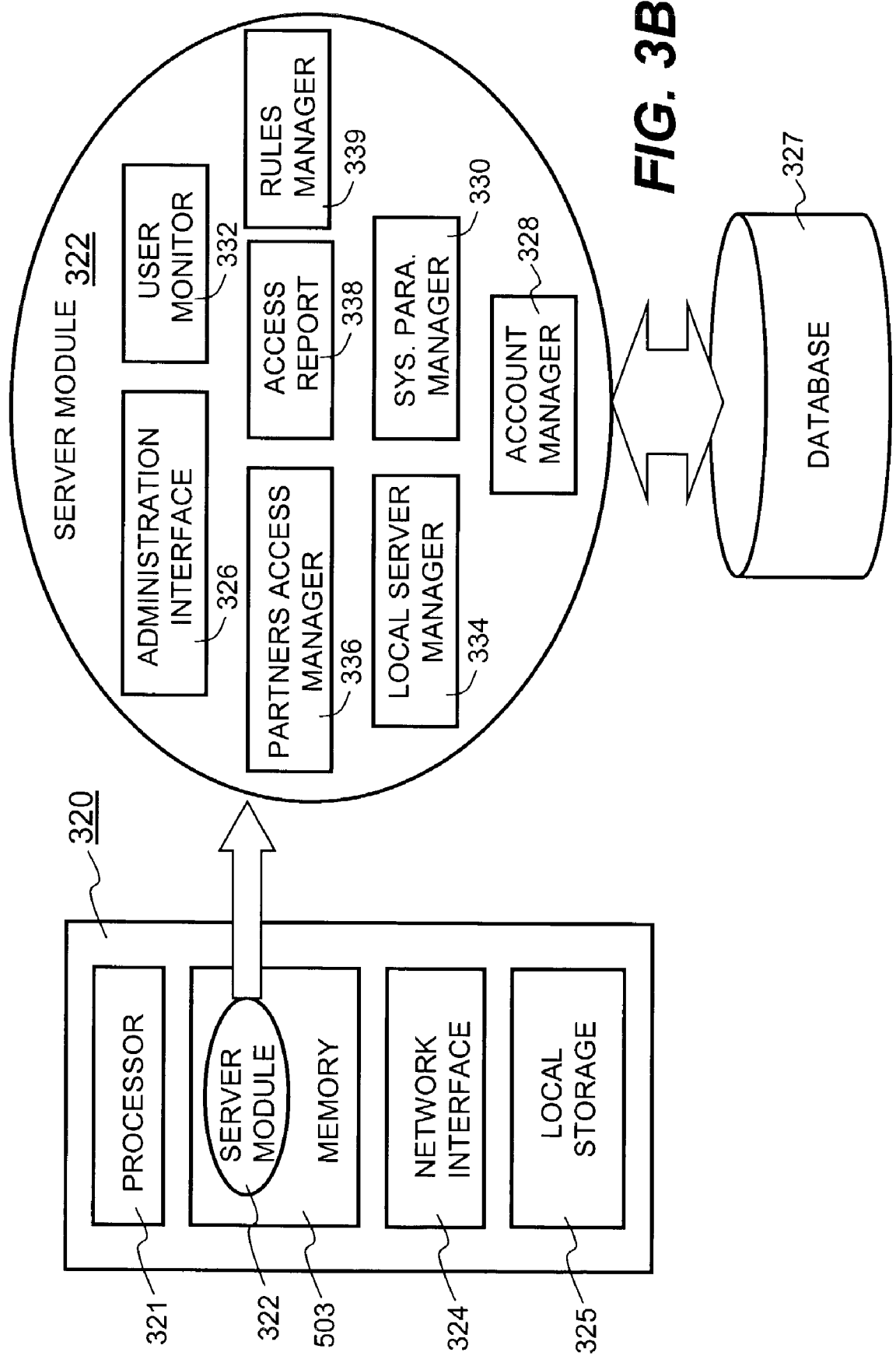

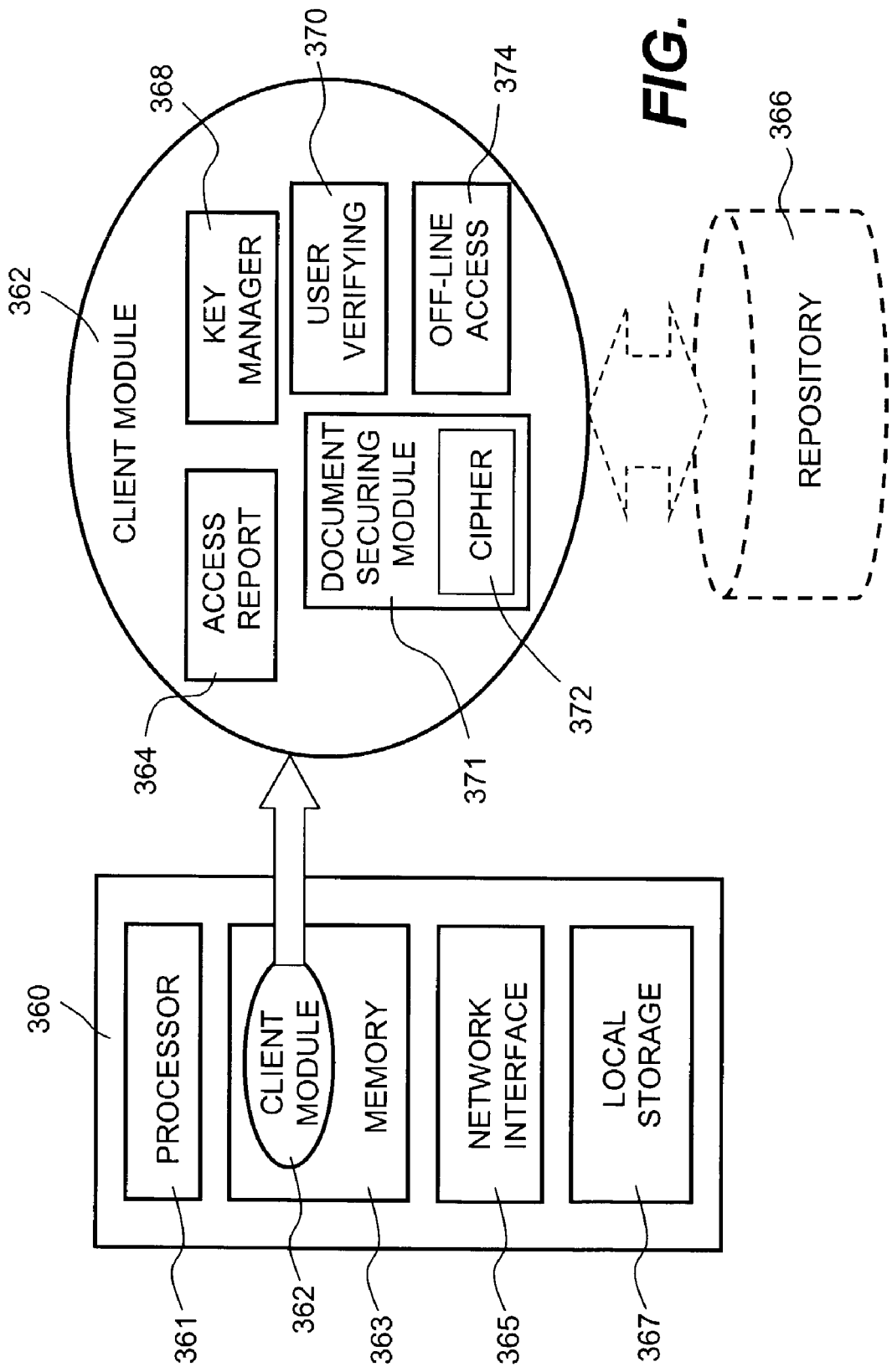

SECURITY SYSTEM USING INDIRECT KEY GENERATION FROM ACCESS RULES AND METHODS THEREFOR

CROSS-REFERENCE TO RELATED APPLICATIONS

This application is a Continuation-In-Part (CIP) of U.S. patent application Ser. No. 10/246,079, filed Sep. 17, 2002, and entitled "SECURITY SYSTEM FOR GENERATING KEYS FROM ACCESS RULES IN A DECENTRALIZED MANNER AND METHODS THEREFOR," which is hereby incorporated by reference for all purposes, which is a Continuation-In-Part (CIP) of U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes, and which claims priority of U.S. Provisional Application No. 60/339,634, filed Dec. 12, 2001, and entitled "PERVASIVE SECURITY SYSTEMS," which is hereby incorporated by reference for all purposes.

This application is also related to: (i) U.S. patent application Ser. No. 10/262,218, filed Sep. 30, 2002, and entitled "DOCUMENT SECURITY SYSTEM THAT PERMITS EXTERNAL USERS TO GAIN ACCESS TO SECURED FILES," which is hereby incorporated by reference for all purposes; (ii) U.S. patent application Ser. No. 10/206,737, filed Jul. 26, 2002, and entitled "METHOD AND SYSTEM FOR UPDATING KEYS IN A DISTRIBUTED SECURITY SYSTEM," which is hereby incorporated by reference for all purposes; (iii) U.S. patent application Ser. No. 10/075,825, filed Feb. 12, 2002, and entitled "METHOD AND APPARATUS FOR ACCESSING SECURED ELECTRONIC DATA OFF-LINE," which is hereby incorporated by reference for all purposes, and (iv) U.S. patent application Ser. No. 10/132,712, filed Apr. 26, 2002, and entitled "METHOD AND SYSTEM FOR PROVIDING MANAGEABILITY TO SECURITY INFORMATION FOR SECURED ITEMS," which is hereby incorporated herein by reference.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process is a cryptographic technique whereby one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Consequently, various cryptographic means are deployed to provide restricted access to electronic data in security systems.

Various security criteria, such as encryption or decryption keys, are often used to facilitate the restricted access in the security systems. However, prolonged use of the security criteria, if not updated, can impose threats to the security of the protected data. While periodic updates to keys can help preserve security, the generation and distribution of key (such as in a network-based system) is a significant burden to system resources. When the system maintains a large number of keys for numerous file and users, the demand of system resources is even more taxing. Therefore, there is a need to provide more effective ways to utilize the security criteria (e.g. the keys) for security systems to secure and protect resources.

SUMMARY OF THE INVENTION

The present invention relates to improved approaches for centralized storage of access restrictions which are associated with public keys. The access restrictions serve to limit access to files secured by a security system. According to one aspect of the present invention, identifiers, or encoded versions thereof are used as public keys to identify particular access restrictions. The identifiers to the access restrictions are used in a decentralized manner for public keys, while the access restrictions themselves are maintained in a centralized manner. As compared to the access restrictions, the public keys based on identifiers tend to be smaller and more uniform in size. The centralized storage of the access restrictions also facilitates subsequent changes to access restrictions for previously secured files.

The public keys are arbitrary strings that embed or encode identifiers to access restrictions. Many expressions can be used as the identifiers. Examples of identifiers include Global Universal Identifiers (GUIDs), pointers or Universal Resource Identifiers (URIs). The access restrictions can be used to enforce access control policies. The public keys are used to encrypt some or all portions of files to be secured. Private keys are used to decrypt the portions of the files that have been encrypted with the public keys. By centrally storing access restrictions associated with public keys, administration of access restrictions in a decentralized manner can be simplified.

The invention can be implemented in numerous ways, including as a method, system, device, and computer readable medium. Several embodiments of the invention are discussed below.

As a method for encrypting a file, one embodiment of the invention includes at least the acts of: obtaining access rules to be imposed; producing a rules string in accordance with the access rules; storing the rules string in a central location; obtaining an identifier for the rules string; generating a public key based on the identifier for the rules string; obtaining a file key; encrypting the file key with the public key; and encrypting at least a portion of the file using the encrypted file key.

As a method for decrypting a secured file that has been previously encrypted, one embodiment of the invention includes at least the acts of: obtaining an identifier for a rules string associated with the secured file to be decrypted; obtaining the rules string associated with the identifier; identifying access rules associated with the rules string; evaluating the access rules to determine whether a user requesting access to the secured file is permitted access to the secured file; denying access to the secured file when the evaluating determines that the access rules do not permit the user to access the secured file; generating a private key based on the access rules and a master key when the evaluating determines that the access rules permit the user to access the secured file; and decrypting, following the generating, at least a portion of the secured file for access thereto by the user through use of the private key.

As a computer readable medium including at least computer program code for encrypting a file, one embodiment of the invention includes at least: computer program code for obtaining access rules to be imposed; computer program code for producing a rules string in accordance with the access rules; computer program code for obtaining an identifier for the rules string; computer program code for generating a public key based on the identifier for the rules string; and computer program code for encrypting at least a portion of the file using the public key or other key encrypted with the public key.

As a computer readable medium including at least computer program code for decrypting a secured file that has been previously encrypted, one embodiment of the invention includes at least: computer program code for obtaining an identifier for a rules string associated with the secured file to be decrypted; computer program code for obtaining the rules string associated with the identifier; computer program code for identifying access rules associated with the rules string; computer program code for evaluating the access rules to determine whether a user requesting access to the secured file is permitted access to the secured file; computer program code for denying access to the secured file when the evaluating determines that the access rules do not permit the user to access the secured file; computer program code for generating a private key based on the access rules and a master key when the evaluating determines that the access rules permit the user to access the secured file; and computer program code for decrypting at least a portion of the secured file for access thereto by the user through use of the private key.

As a computer readable medium including at least computer program code for encrypting a file, another embodiment of the invention includes at least: computer program code for obtaining access rules to be imposed; computer program code for producing a rules string in accordance with the access rules; computer program code for obtaining an identifier for the rules string; computer program code for obtaining a key block of the file to be encrypted, the file including at least the key block and a data block; computer program code for generating a public key based on the identifier for the rules string; and computer program code for encrypting the key block portion of the file using the public key or other key encrypted with the public key.

As a computer readable medium including at least computer program code for decrypting a secured file that has been previously encrypted, another embodiment of the invention includes at least: computer program code for obtaining an identifier for a rules string associated with the secured file to be decrypted; computer program code for obtaining the rules string associated with the identifier; computer program code for identifying access rules associated with the rules string; computer program code for evaluating the access rules to determine whether a user requesting access to the secured file is permitted access to the secured file; computer program code for denying access to the secured file when the evaluating determines that the access rules do not permit the user to access the secured file; computer program code for obtaining an encrypted key block of the secured file; computer program code for generating a private key based on the access rules and a master key when the computer program code for evaluating determines that the access rules permit the user to access the secured file; computer program code for decrypting the encrypted key block using the private key to obtain a file key; and computer program code for thereafter decrypting at least a portion of the secured file for access thereto by the user through use of the file key.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings wherein:

FIG. 1C shows still another system configuration in which the invention may be practiced in accordance with an embodiment thereof.

FIG. 3B is a functional block diagram of a server device in accordance with one embodiment of the invention.

FIG. 3D is a functional block diagram of a client machine according to one embodiment of the invention.

DETAILED DESCRIPTION OF THE INVENTION

Figure 1A:
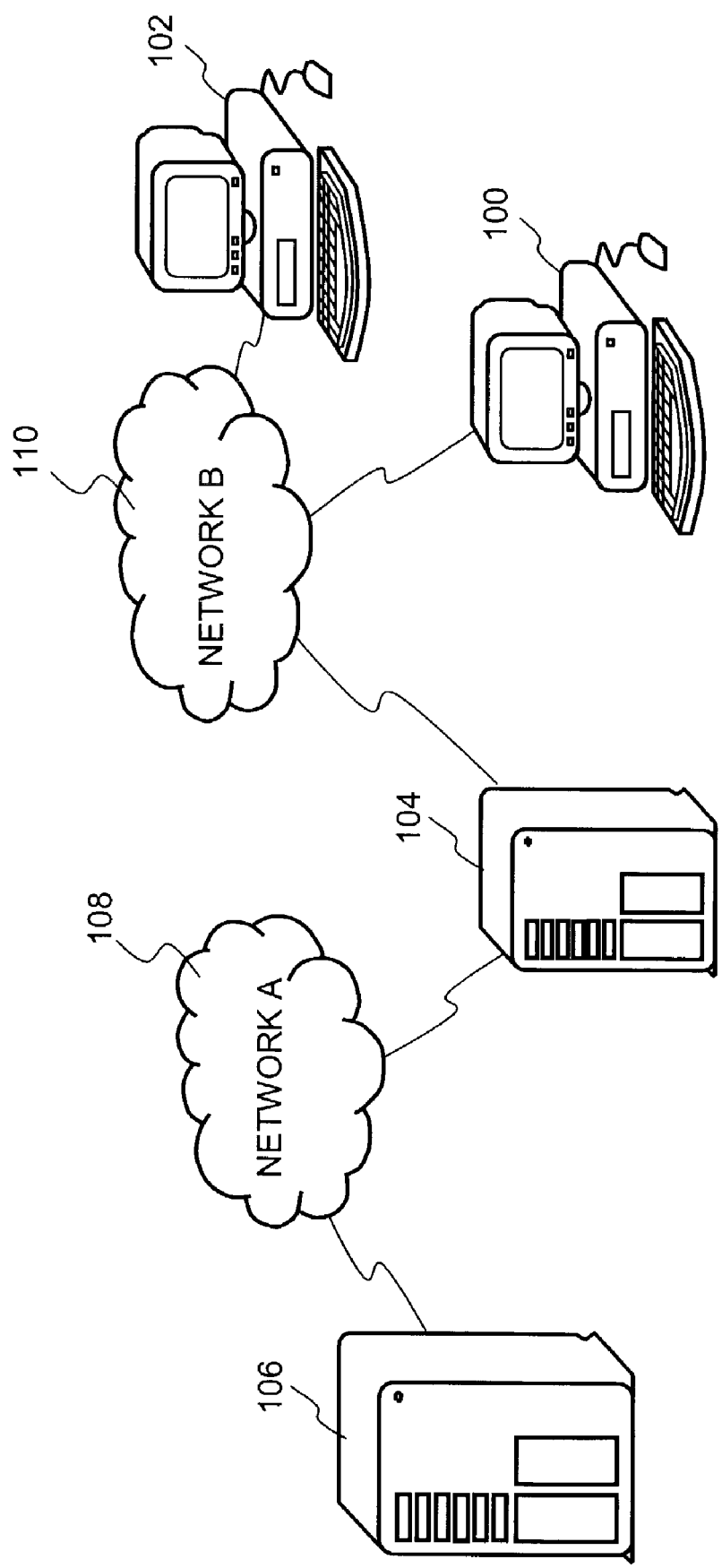
FIG. 1A shows a basic system configuration in which the invention may be practiced in accordance with an embodiment thereof.

The invention relates to improved approaches for centralized storage of access restrictions which are associated with public keys. The access restrictions serve to limit access to files secured by a security system. According to one aspect of the present invention, identifiers, or encoded versions thereof, are used as public keys to identify particular access restrictions. The identifiers to the access restrictions are used in a decentralized manner for public keys, while the access restrictions themselves are maintained in a centralized manner. As compared to the access restrictions, the public keys based on identifiers tend to be smaller and more uniform in size. The centralized storage of the access restrictions also facilitates subsequent changes to access restrictions for previously secured files. The present invention is particularly suitable in an enterprise environment.

The public keys are arbitrary strings that embed or encode identifiers to access restrictions. The identifiers can, for example, be considered Global Universal Identifiers (GUIDs), pointers or Universal Resource Identifiers (URIs). The access restrictions can be used to enforce access control policies. The public keys are used to encrypt some or all portions of files to be secured. Private keys can be generated to decrypt the portions of the files that have been encrypted with the public keys. By centrally storing access restrictions associated with public keys, administration of public keys produced in a decentralized manner can be simplified.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being.

Secured files are files that require one or more keys, passwords, access privileges, etc. to gain access to their content. According to one aspect of the present invention, the security is provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains, or points to, security information. The security information is used to determine whether access to associated data portions of secured files is permitted.

In the following description, numerous specific details are set forth in order to provide a thorough understanding of the present invention. However, it will become obvious to those skilled in the art that the present invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-11. However, those skilled in the art will readily appreciate that the detailed description given herein with respect to these figures is for explanatory purposes as the invention extends beyond these limited embodiments.

FIG. 1A shows a basic system configuration in which the present invention may be practiced in accordance with one embodiment thereof. Documents or files may be created using an authoring tool executed on a client computer 100, which may be a desktop computing device, a laptop computer, or a mobile computing device. Exemplary authoring tools may include application programs such as Microsoft Office (e.g., Microsoft Word, Microsoft PowerPoint, and Microsoft Excel), Adobe FrameMaker and Adobe Photoshop.

According to one embodiment, the client computer 100 is loaded with a client module that is capable of communicating with a server 104 or 106 over a data network (e.g., the Internet or a local area network). According to another embodiment, the client computer 100 is coupled to the server 104 through a private link. As will be further explained below, a document or file created by an authoring tool can be secured by the client module. The client module, when executed, is configured to ensure that a secured document is secured at all times in a store (e.g., a hard disk or other data repository). The secured documents can only be accessed by users with proper access privileges. In general, an access privilege or access privileges for a user may include, but not be limited to, privileges pertaining to viewing, copying, printing, editing, transferring, uploading/downloading, and location.

According to one embodiment, a created document is caused to go through an encryption process that is preferably transparent to a user. In other words, the created document is encrypted or decrypted under the authoring application so that the user is not aware of the process. A key (referred to herein as a user key) can be used to retrieve a file key to decrypt an encrypted document. Typically, the user key is associated with an access privilege for the user or a group of users. For a given secured document, only a user with a proper access privilege can access the secured document.

In one setting, a secured document may be uploaded via the network 110 from the computer 100 to a computing or storage device 102 that may serve as a central repository. Although not necessary, the network 110 can provide a private link between the computer 100 and the computing or storage device 102. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computer 100 may be remotely accessed.

In another setting, the computer 100 and the computing or storage device 102 are inseparable, in which case the computing or storage device 102 may be a local store to retain secured documents or receive secured network resources (e.g., dynamic Web contents, results of a database query, or a live multimedia feed). Regardless of where the secured documents or secured resources are actually located, a user, with proper access privilege, can access the secured documents or resources from the computer 100 or the computing or storage device 102 using an application (e.g., Internet Explorer, Microsoft Word or Acrobat Reader).

The server 104, also referred to as a local server, is a computing device coupled between a network 108 and the network 110. According to one embodiment, the server 104 executes a local version of a server module. The local version is a localized server module configured to service a group of designated users or client computers, or a location. Another server 106, also referred to as a central server, is a computing device coupled to the network 108. The server 106 executes the server module and provides centralized access control management for an entire organization or business. Accordingly, respective local modules in local servers, in coordination with the central server, form a distributed mechanism to provide distributed access control management. Such distributed access control management ensures the dependability, reliability and scalability of centralized access control management undertaken by the central server for an entire enterprise or a business location.

Figure 1B:
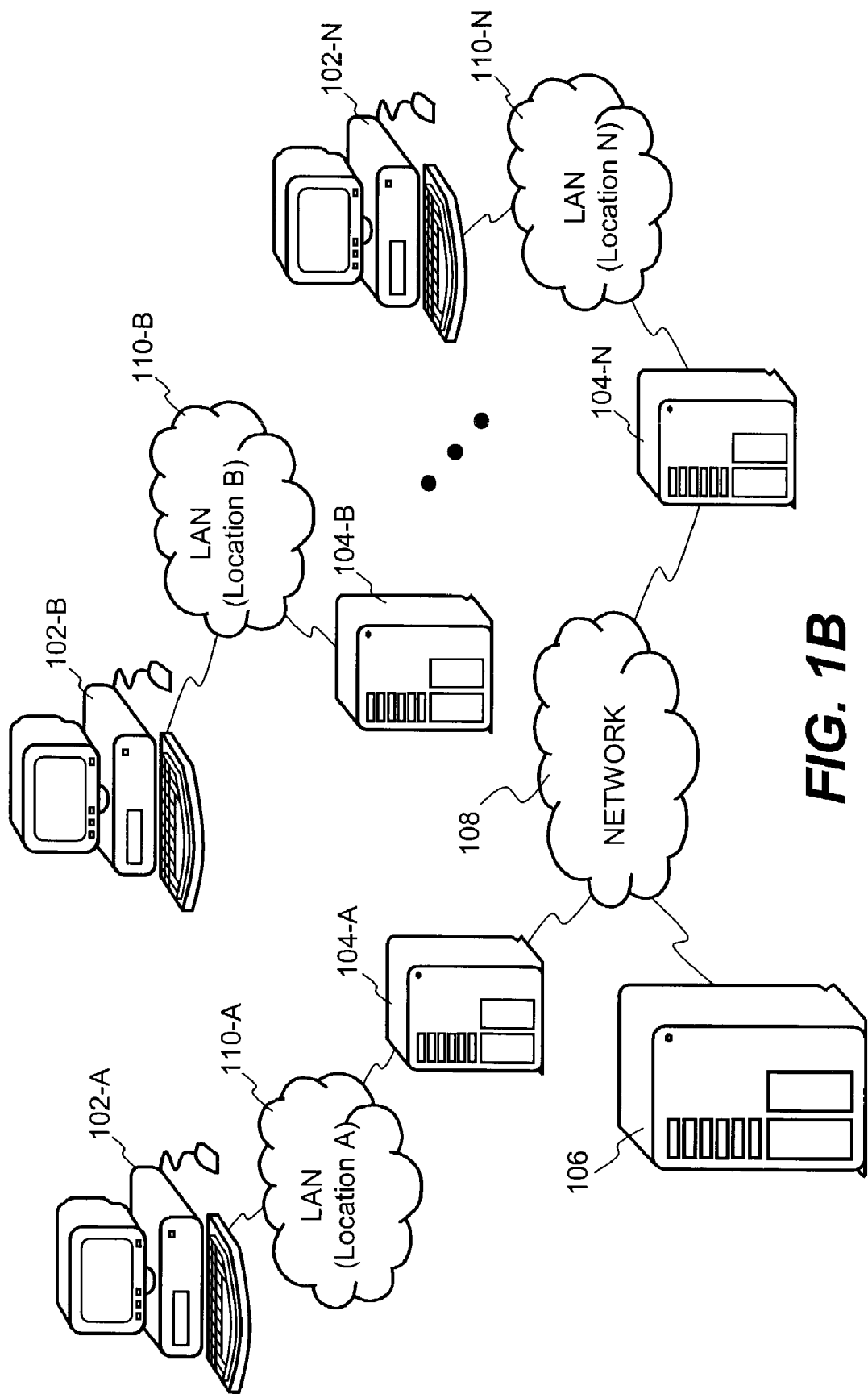
FIG. 1B shows another system configuration in which the invention may be practiced in accordance with an embodiment thereof.

FIG. 1B shows another system configuration in which the invention may be practiced in accordance with an embodiment thereof. Here, the configuration employs a central server and local servers. The configuration may correspond to a large enterprise having multiple geographic locations or offices. A central server 106 maintains a database managing the access privileges and the access rules in the entire enterprise. One of the features in this configuration is the underlying capability to provide fault tolerance and efficient AC (Access Control) management for a large group of users. Instead of having the central server 106 performing the AC management for each of the users at one single location, a number of local servers 104 (e.g., 104-A, 104-B, . . . and 104-N) are employed in a distributed manner to service the individual locations or offices. Each of local servers 104 executes a local module derived or duplicated from the server module being executed at the central server 106 to manage those users who are local to respective local servers 104. The central server 106 can centralize the AC management in addition to managing the users if necessary.

According to one embodiment, a local module can be a customized version of the server module that runs efficiently for only a few locations or a group of users. For example, a local server 104-A is only responsible for the users or computers 102-A in location A, while a local server 104-B is only responsible for the users or computers 102-B in location B. As a result, even if the central server 106 has to be taken down for maintenance or is not operative at the time a user needs to access secured documents, the access control will not be disrupted. The detailed operation of the local servers 104 in cooperation with the central server 106 will be further described below.

According to another embodiment, a local module is a replicated version of the server module and exchanges any updates with the server module when connected (e.g., periodically or at request). Depending on implementation, part or all of the server module can be duplicated in a local server to ensure that communications with users or their client machines are efficient and fault tolerance. As a result, even if the central server 106 has to be taken down for maintenance or is not operative at the time a user needs to access secured documents, the access control will not be disruptive. For example, in such a situation, any of the local servers 104 can step up and take the place of the central server. When the central server 106 is running or communicating with the local servers 104, information collected at the respective local servers about the users or their activities is sent back to the central server 106. The detailed operation of the local servers 104 in cooperation with the central server 106 in this regard will also be further provided below.

FIG. 1C shows still another system configuration in which the invention may be practiced in accordance with an embodiment thereof. This configuration is suitable for a small group of users. In this configuration, no local servers are employed. A server computer 112 is loaded with the server module and each of the users or terminal computers 116 (only one is shown therein) is loaded with a client module. The users or the terminal computers 16 couple to the server computer 112 through a local area network. The server computer 112 performs the AC management for each of the users or the terminal computers 116.

Figure 1D:
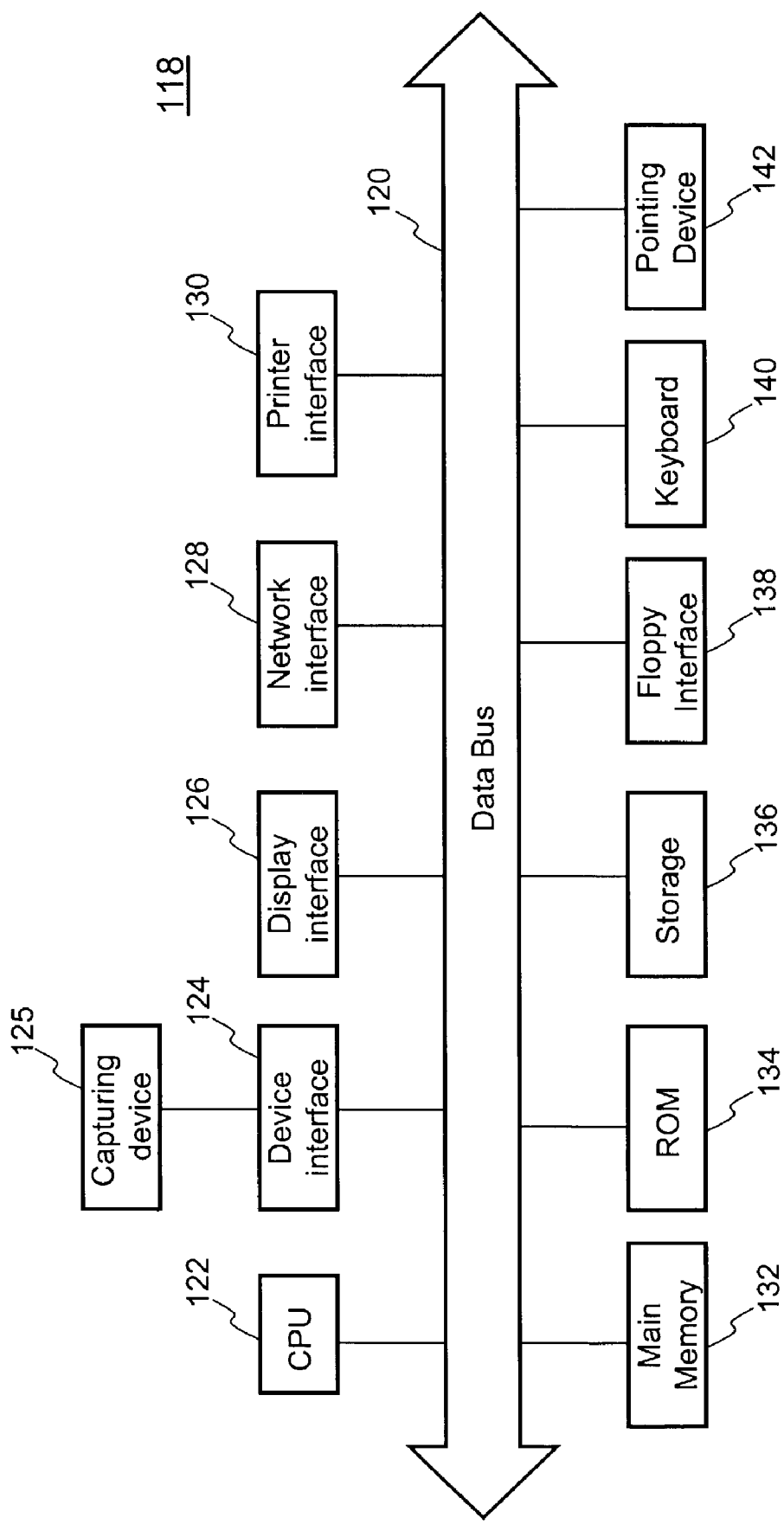
FIG. 1D shows internal construction blocks of a computing device in which the invention may be implemented and executed.

FIG. 1D shows internal construction blocks of a computing device 118 in which one embodiment of the present invention may be implemented and executed. The computing device 118 may correspond to a client device (e.g., computer 100, computing or storage device 102 in FIG. 1A) or a server device (e.g., server 104, 106 in FIG. 1A). As shown in FIG. 1B, the computing device 118 includes a central processing unit (CPU) 122 interfaced to a data bus 120. The CPU 122 executes instructions to process data and perhaps manage all devices and interfaces coupled to data bus 120 for synchronized operations. The instructions being executed can, for example, pertain to drivers, operating system, utilities or applications. Device interface 124 may be coupled to an external device, such as the computing device 102 of FIG. 1A; hence, the secured documents therefrom can be received into memory 132 or storage 136 through data bus 120. Also interfaced to data bus 120 is a display interface 126, a network interface 128, a printer interface 130 and a floppy disk drive interface 138. Generally, a client module, a local module or a server module of an executable version of one embodiment of the present invention can be stored to storage 136 through floppy disk drive interface 138, network interface 128, device interface 124 or other interfaces coupled to data bus 120. Execution of such module by the CPU 122 can cause the computing device 118 to perform as desired in the present invention. In one embodiment, the device interface 124 provides an interface for communicating with a capturing device 125 (e.g., a fingerprint sensor, a smart card reader or a voice recorder) to facilitate the authentication of a user of the computing device 118.

Main memory 132, such as random access memory (RAM), is also interfaced to data bus 120 to provide the CPU 122 with instructions and access to memory storage 136 for data and other instructions. In particular, when executing stored application program instructions, such as for document securing or document accessing, the CPU 122 is caused to manipulate the data to achieve results contemplated by the program instructions. Read-only memory (ROM) 134 is provided for storing executable instructions, such as a basic input/output operation system (BIOS) for operation of keyboard 140, display 126 and pointing device 142 which may be present.

In one embodiment, the computing device 118 is capable of storing secured items (e.g., secured files) in the main memory 132 or the storage 136. The main memory 132 provides non-persistent (i.e., volatile) storage for the secured items and the storage 136 provides persistent (i.e., non-volatile) storage for the secured items. Hence, the computing or storage device 102, or more particularly, the main memory 132 and/or the storage 136, can act as a storage device for the secured items.

Figure 2A:
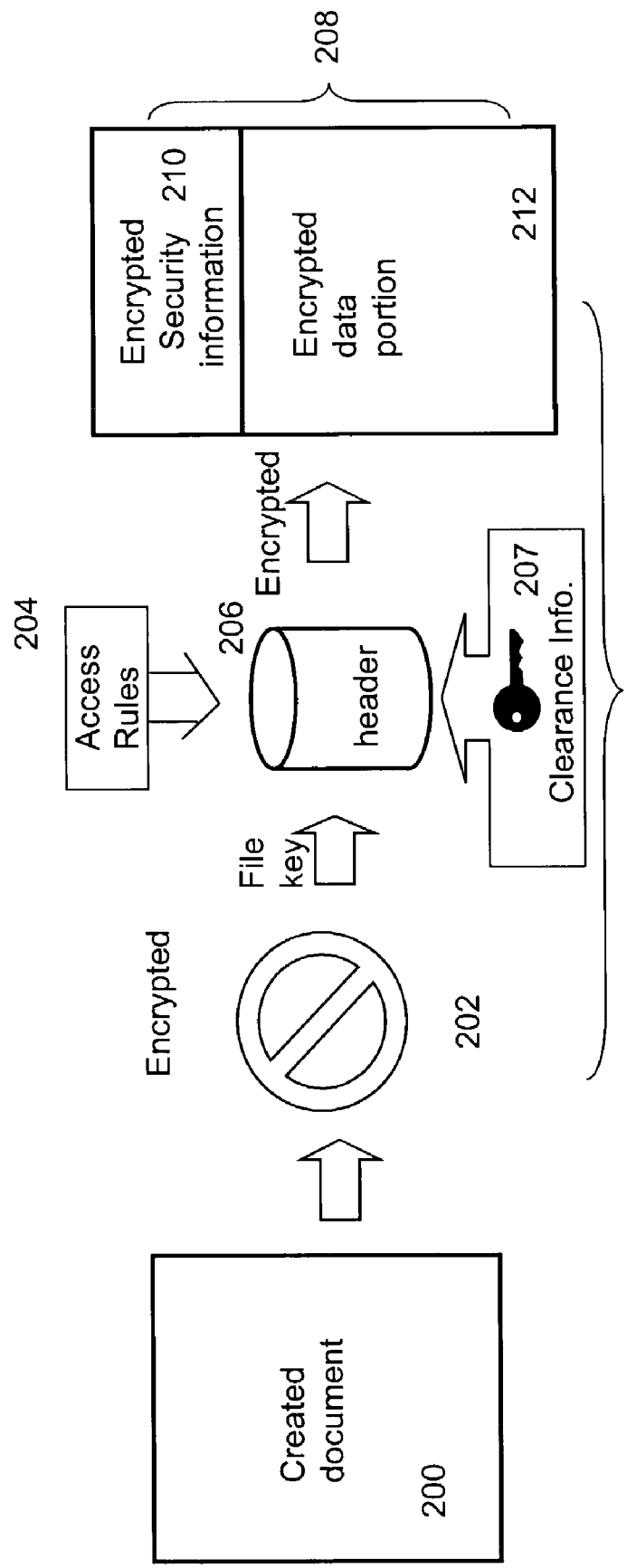
FIG. 2A is a block diagram of securing a created document according to one embodiment of the invention.

Referring now to FIG. 2A, a block diagram of securing a created document 200 is shown according to one embodiment of the invention. For example, the created document 200 is a created file. After the document 200 is created, edited or opened with an application or authoring tool (e.g., Microsoft Word), upon an activation of a command, such as "Save," "Save As" or "Close", or automatic saving invoked by an operating system, the application itself or an approved application, the created document 200 is caused to undergo a securing process 201. The securing process 201 starts with an encryption process 202, namely the document 200 that has been created or is being written into a store is encrypted by a cipher (e.g., an encryption process) with a file key (i.e., a cipher key). In other words, the encrypted data portion 212 could not be opened without the file key. For the purpose of controlling the access to the contents in the document 200 or the resultant secured file 208, the file key or keys may be the same or different keys for encryption and decryption and are included as part of security information contained in or pointed to by a header 206. The file key or keys, once obtained, can be used to decrypt the encrypted data portion 212 to reveal the contents therein.

To ensure that only authorized users or members of an authorized group can access the secured file 208, a set of access rules 204 for the document 200 is received or created and associated with the header 206. In general, the access rules 204 determine or regulate who and/or how the document 200, once secured, can be accessed. In some cases, the access rules 204 also determine or regulate when or where the document 200 can be accessed.

In addition, security clearance information 207 can be added to the header 206 if the secured file 208 is classified. In general, the security clearance information 207 is used to determine a level of access privilege or security level of a user that is attempting to access the contents in the secured file 208. For example, a secured file may be classified as "Top secret", "Secret", "Confidential", and "Unclassified". According to one embodiment, the security clearance information 207 includes another layer of encryption of the file key with another key referred to herein as a clearance key. An authorized user must have a clearance key of proper security level in addition to an authenticated user key and proper access privilege to retrieve the file key. As used herein, a user key or a group key is a cipher key associated with an authenticated user and may be used to access a secured file or secure a file, or create a secured file. Additional detail on obtaining such a user key upon a user being authenticated is provided in U.S. patent application Ser. No. 10/075,194, which is hereby incorporated herein by reference.

According to another embodiment, the security clearance information 207 includes a set of special access rules to guard the file key. The retrieval of the file key requires that the user pass an access rule measurement. Since access privilege of a user may be controlled via one or more system parameters (e.g., rules or policies), the access rule measurement can determine if the user has sufficient access privilege to retrieve the file key in conjunction with the corresponding user key.

In accordance with the security clearance information 207, a user may be assigned a hierarchical security clearance level based on, perhaps, a level of trust assigned to the user. A level of trust implies that one user may be more trusted than another and hence the more trusted user may access more classified files. Depending on implementation, a level of trust may be based on job responsibility of the user or a role of the user in a project or an organization background checks, psychological profiles, length of service, etc. In any case, a level of trust assigned to the user is an additional aspect to the access privilege of the user such that the user must have proper security clearance to access a classified secured file even if the user is permitted by the access rules to access the file.

In general, a header is a file structure, preferably small in size, and includes, or perhaps links to, security information about a resultant secured document. Depending on implementation, the security information can be entirely included in a header or pointed to by a pointer that is included in the header. The security information further includes the file key and/or one or more clearance keys, in some cases, an off-line access permit (e.g., in the access rules) should such access be requested by an authorized user. The security information is then encrypted by a cipher (i.e., an encryption/decryption scheme) with a user key associated with an authorized user to produce encrypted security information 210. The encrypted header 206, if no other information is added thereto, is attached to or integrated with the encrypted data portion 212 to generate the resultant secured file 208. In a preferred embodiment, the header is placed at the beginning of the encrypted document (data portion) to facilitate an early detection of the secured nature of a secured file. One of the advantages of such placement is to enable an access application (i.e., an authoring or viewing tool) to immediately activate a document securing module (to be described where it deems appropriate) to decrypt the header if permitted. Nevertheless, there is no restriction as to where the encrypted header 206 is integrated with the encrypted data portion 212.

It is understood that a cipher may be implemented based on one of many available encryption/decryption schemes. Encryption and decryption generally require the use of some secret information, referred to as a key. For some encryption mechanisms, the same key is used for both encryption and decryption; for other mechanisms, the keys used for encryption and decryption are different. In any case, data can be encrypted with a key according to a predetermined cipher (i.e., encryption/decryption) scheme. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any cipher scheme that is effective and reliable may be used. Hence, the details of a particular scheme are not further discussed herein so as to avoid obscuring aspects of the present invention.

In essence, the secured document 208 includes two parts, the encrypted data portion 212 (i.e., encrypted version of the document itself) and the header 210 that may point to or include encrypted security information for the secured document 208. To access the contents in the encrypted data portion 212, one needs to obtain the file key to decrypt the encrypted data portion 212. To obtain the file key, one needs to be authenticated to get a user or group key and pass an access test in which at least the access rules in the security information are measured against the user's access privilege (i.e., access rights). If the secured file is classified, it further requires a security level clearance on the user. In general, the security clearance level of the user must be high enough before the file key can be retrieved.

Figure 2B:
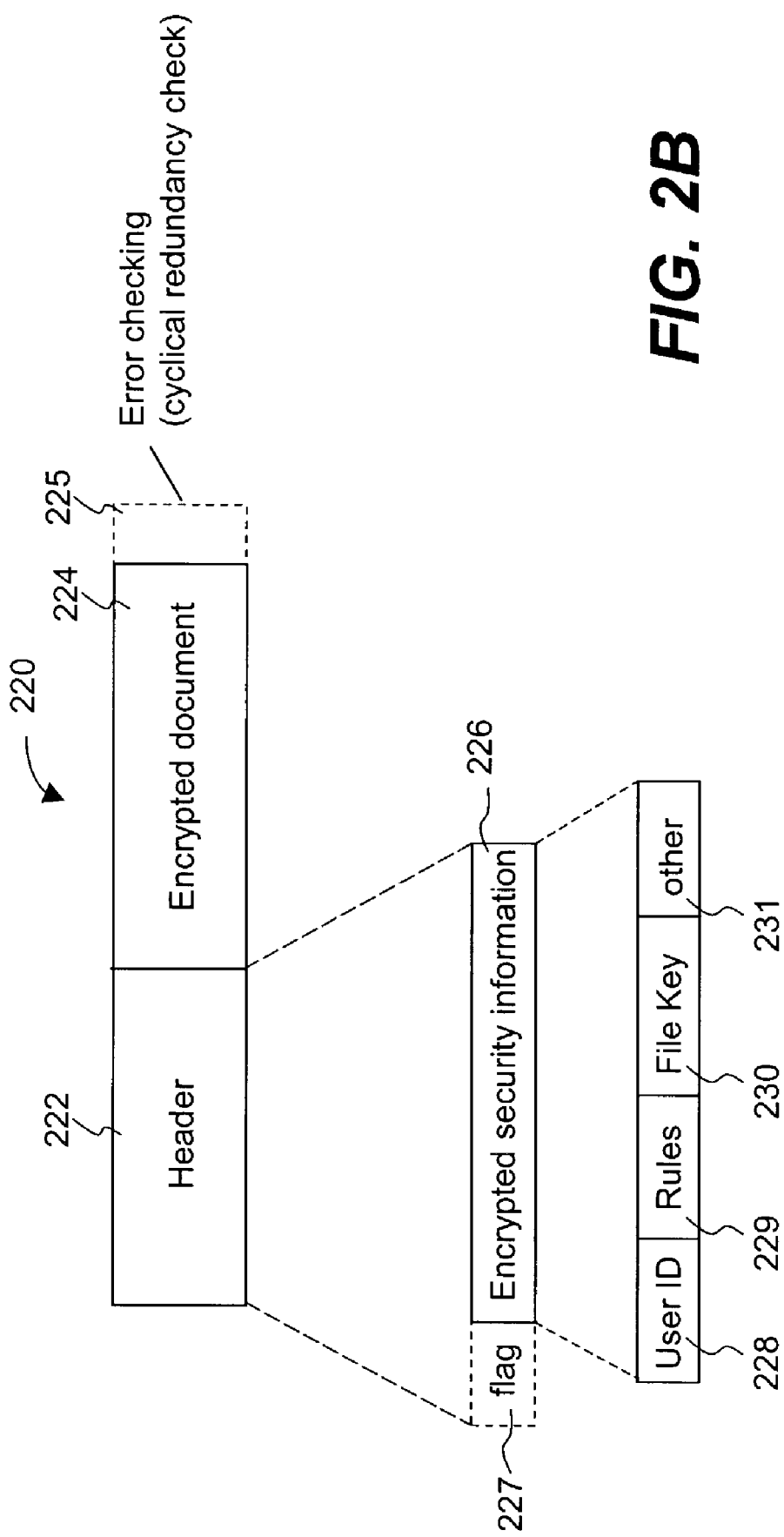
FIG. 2B illustrates an exemplary structure of a secured document including a header and an encrypted portion.

FIG. 2B illustrates an exemplary structure of a secured document 220 including a header 222 and an encrypted portion 224. The header 222 includes a security information block 226 having encrypted security information that essentially controls the access to the encrypted document 224. In a certain implementation, the header 222 includes a flag 227 (e.g., a predetermined set of data) to indicate that the document 220 is secured. The security information block 226 includes one or more user IDs 228, access rules 229, at least one file key 230 and other information 231. The user IDs 228 maintain a list of authorized users who may be measured against the access rules 229 before the file key 230 can be retrieved. The access rules 229 determine at least who and how the encrypted document 224 can be accessed. Depending on an implementation, the other information 231 may be used to include other information facilitating a secure access to the encrypted document 224, the example may include version numbers or author identifier.

In general, the data portion of a secured item is a document or file encrypted with a cipher (e.g., a symmetric or asymmetric encryption scheme). Encryption is the transformation of data into a form that is impossible to read without appropriate knowledge (e.g., a key). Its purpose is to ensure privacy by keeping information hidden from anyone to whom it is not intended, even those who have access to other encrypted data. Decryption is the reverse of encryption. Encryption and decryption generally require the use of some secret information, referred to as a key. For some encryption mechanisms, the same key is used for both encryption and decryption; for other mechanisms, the keys used for encryption and decryption are different.

For the purpose of controlling the access to the document, the key or keys, referred collectively to as a file key, may be the same or different keys for encryption and decryption and are preferably included in the security information contained in, or pointed to by, the header and, once obtained, can be used to decrypt the encrypted document. To ensure that the key is not to be retrieved or accessible by anyone, the key itself is guarded by the access privileges and rules. If a user requesting the document has the proper access privileges that can be granted by the access rules and system policies if there are any, the key will be retrieved to proceed with the decryption of the encrypted document.

To ensure that the security information or the header is not readily revealed, at least a portion of the header itself can be encrypted with a cipher. Depending on an exact implementation, the cipher for the header may or may not be identical to the one used for the document. The key (referred to as a user key) to decrypt the encrypted header can, for example, be stored in a local store of a terminal device and activated only when the user associated with it is authenticated. As a result, only an authorized user can access the secured document. In one embodiment, the key is associated with a user's login to a local server or a central server. Appropriate access privileges associated with the user can then be validated if the user has been authenticated or previously registered with the server and properly logged in. Optionally, the two portions (i.e., the header (possibly encrypted) and the encrypted document) can be encrypted again and only decrypted by a user key. In another option, the encrypted portions (either one or all) can be error-checked by an error-checking portion, such as using a cyclical redundancy check to ensure that no errors have been incurred to the encrypted portion(s) of the secured document.

In general, each of the users in a security system is assigned a user key or user keys (e.g., a user public key and a private key). In some cases, the user key is also referred to as a group key if a user is a member of group (e.g., Engineering) that has uniform access privilege. In one application, the user public key is used to encrypt some or all of the security information in the header and the user private key is used to get into the security information or header for the purpose of retrieving the file or document key so as to decrypt the encrypted data portion or the encrypted document. Unless specified otherwise, a user key herein indicates either or both of the user public key and the private key or a security key that is needed in the system to retrieve the file key to decrypt the encrypted data portion.

In a typical enterprise environment, different users may have different access privileges, some may access all secured files while others may access some of the secured files with restricted actions (i.e., printing, reading or editing, but not forwarding). Whether a user can ultimately achieve the access to the encrypted data portion in a secured file is controlled by the access rules or additional key(s) in the security information of the header. Limited by a user's access privilege, a user key associated with the user may facilitate access to all secured files.

Figure 3A:
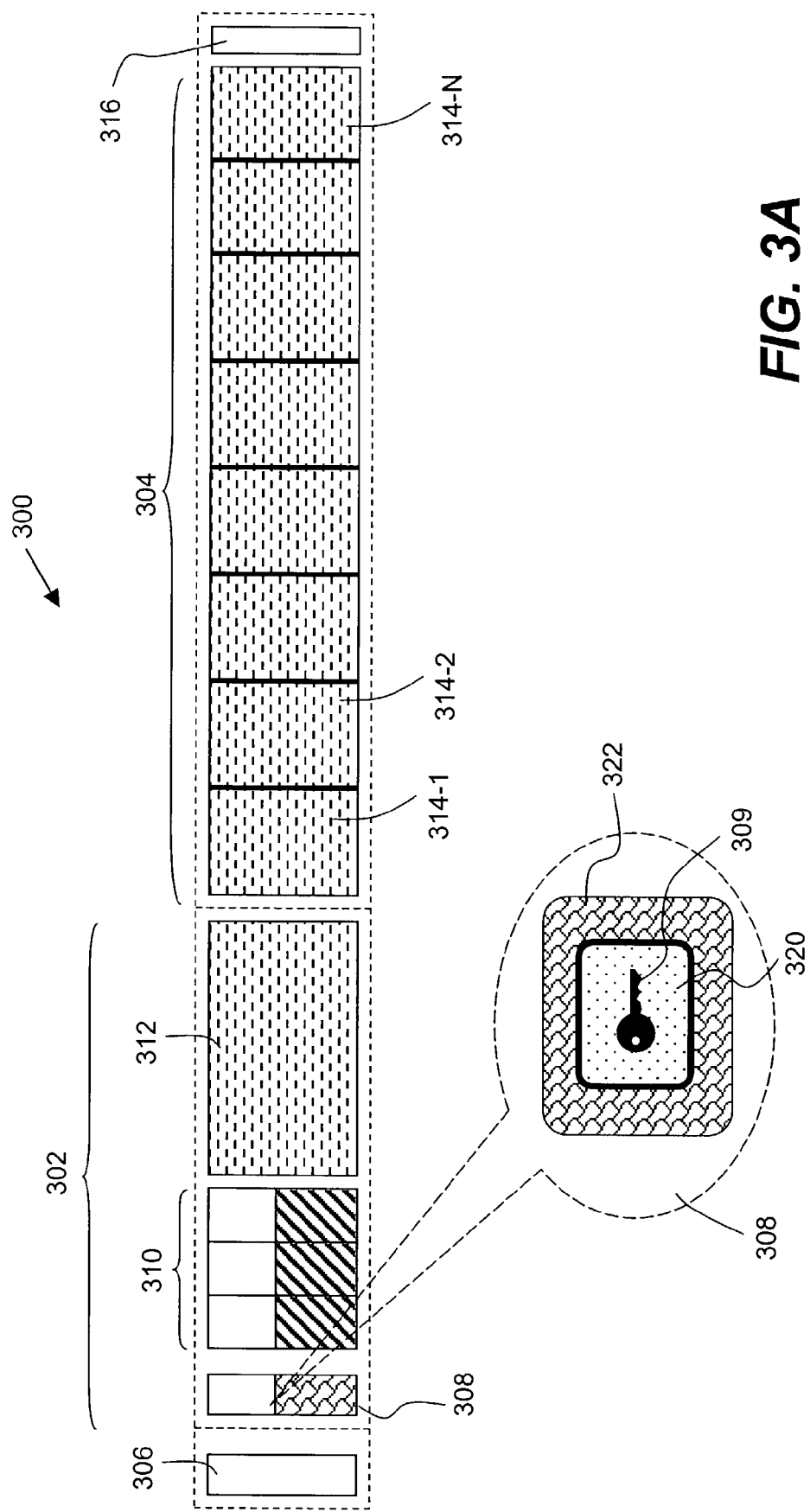
FIG. 3A illustrates a representative data structure of a secured file including a header and an encrypted data portion according to one embodiment of the invention.

FIG. 3A illustrates a representative data structure of a secured file 300 including a header 302 and an encrypted data portion 304 according to one embodiment of the invention. The secured file 300 is secured by access rules and use of encryption. A user must possess a user key, a protection key, a file key and sometimes a clearance key in order to access the secured file 300. Depending on implementation, the header 302 may or may not include a flag or signature 306. In one case, the signature 306 is used to facilitate the detection of the security nature of a secured file among other files. The header 302 includes a file key block 308, a key block 310 and a rule block 312. The file key block 308 includes a file key 309 that is encrypted by a cipher with a protection key 320 (i.e., a doc-key key sometimes) and further with a clearance key 322 associated with a user that attempts to access the secured file 300. Alternatively, the file key 309 is encrypted with the clearance key 322 and then the protection key 320. The protection key 320 is encrypted and stored in the key block 310. In general, the key block 310 has an encrypted version of the protection key 320 and can be only accessible by designated user(s) or group(s). There may be more than one key blocks 310 in a header, wherein three key blocks are shown in FIG. 3A. To recover or retrieve the protection key 320, a designated user must have proper access privilege to pass an access rule test with the embedded access rules in the rule block 312.

All access rules are encrypted with a user key (e.g., a public user key) and stored in the rule block 312. A user attempting to access the secured file uses must have a proper user key (e.g., a private user key) to decrypt the access rules in the rule block 312. The access rules are then applied to measure the access privileges of the user. If the user is permitted to access the secured file in view of the access rules, the protection key 320 in the key block 310 is retrieved to retrieve the file key 309 so as to access the encrypted data portion 304. However, when it is detected that the secured file is classified, which means that the file key can not be retrieved with only the protection key, the user must posses a clearance key. Only the user that has the clearance key and the retrieved protection key 320 is able to retrieve the file key 309 and proceed with the decryption of the encrypted data portion 304.

According to one embodiment, the encrypted data portion 304 is produced by encrypting a file that is non-secured. For example, a non-secured document can be created by an authoring tool (e.g., Microsoft Word). The non-secured document is encrypted by a cipher with the file key. The encryption information and the file key are then stored in the security information, namely, the file key block 308 of the header 302.

According to another embodiment, the non-secured document (data) is encrypted using the following aspects, a strong encryption using a CBC mode, a fast random access to the encrypted data, and an integrity check. To this end, the data is encrypted in blocks. The size of each block may be a predetermined number or specific to the document. For example, the predetermined number may be a multiple of an actual encryption block size used in an encryption scheme. One of the examples is a block cipher (i.e., a type of symmetric-key encryption algorithm that transforms a fixed-length block of plaintext (unencrypted text) data into a block of ciphertext (encrypted text) data of the same length. This transformation takes place under the action of a cipher key (i.e., a file key). Decryption is performed by applying the reverse transformation to the ciphertext block using another cipher key or the same cipher key used for encryption. The fixed length is called the block size, such as 64 bits or 128. Each block is encrypted using a CBC mode. A unique initiation vector (IV) is generated for each block.

Other encryption of the non-secured data can be designed in view of the description herein. In any case, the encryption information and the file key are then stored in the security information. One aspect of the present invention is that the integration of a header and the encrypted data portion will not alter the original meaning of the data that is otherwise not secured. In other words, a designated application may still be activated when a secured file is selected or "clicked". For example, a document "xyz.doc", when selected, will activate an authoring tool, e.g., Microsoft Word, commonly seen in a client machine. After the document "xyz.doc" is secured in accordance with the present invention, the resultant secured file is made to appear the same, "xyz.doc" that still can activate the same authorizing tool, except now the secured file must go through a process to verify that a user is authenticated, the user has the proper access privilege and (if imposed) sufficient security clearance.

Further, with the protection key, the file key can be updated without having to modify the key-blocks. For example, with respect to FIG. 3A, the file key 309 in the file key block 308 can be updated without having to modify the key-blocks 310. One of the features in the structure shown in FIG. 3A is that the underlying mechanism facilitates the updating and management of the file key.

In the above-described embodiment in FIG. 3A, the access rules were encrypted with a user's public key. Those skilled in the art can appreciate that the access rules can be encrypted in other ways. For example, the access rules may be also encrypted with a file encryption key (i.e., the file key) or the protection key. In this case, the protection key is encrypted with a user's public key or together with a clearance key associated with the user if a subject secured file is secured. Alternatively, instead of retrieving the protection key after the access rules are successfully measured against access privilege of the user attempting to access a secured file, the protection key can be retrieved first with a user's private key. The protection key can be used to retrieve the access rules that are subsequently used to measure against the access privilege of the user if the protection key was used to encrypt the access rules. If the user is permitted to access the contents in the file, the file key is then retrieved with the protection key (or together with the clearance key). Alternatively, right after the protection key is retrieved, the protection key (or together with the clearance key) is used to retrieve the file key. The file key is then to retrieve the access rules that are subsequently used to measure against the access privilege of the user. In any case, if the user is determined have sufficient access privilege in view of all access policies, if there are any, the retrieved file key can be used to continue the decryption of the encrypted data portion.

It should be noted that the header in a secured document may be configured differently than noted above without departing from the principles of the present invention. For example, a secured document may include a header with a plurality of encrypted headers, each can be accessible only by one designated user or a group users. Alternatively, a header in a secured document may include more than one set of security information or pointers thereto, each set being for one designated user or a group of users while a single file key can be used by all. Some or all of the access rules may be viewed or updated by users who can access the secured document.

In another alternative representative data structure for a secured file, the header can include at least one pointer which points to a remote data structure stored in a storage device. The remote data structure can store some or all of the security information, thereby shortening the size of the header and improving manageability of security information. The storage device is typically a local storage device. In other words, the alternative data structure and the remote data structure are typically stored on a common machine (e.g., desktop or portable computer). The data structure stores security information. Additional details on the alternative data structure can be found in U.S. application Ser. No. 10/132,712, filed Apr. 26, 2002, and entitled "METHOD AND SYSTEM FOR PROVIDING MANAGEABILITY TO SECURITY INFORMATION FOR SECURED ITEMS," which is hereby incorporated herein by reference.

According to one embodiment, the access rules are present in a descriptive language such as text or a markup language (e.g., HTML, SGML and XML). In a preferred embodiment, the markup language is eXtensible Access Control Markup Language (XACML) that is essentially an XML specification for expressing policies for information access. In general, XACML can address fine-grained control of authorized activities, the effect of characteristics of the access requestor, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

The security system according to the invention can, in general, include or make use of one to many user computers and at least one central server. The security system can also include or make use of one or more local servers as desired. In other words, the security system can operate in a distributed fashion.

Referring now to FIG. 3B, there is shown a functional block diagram of a server device 320 in accordance with one embodiment of the invention. The server device includes a server module 322 that resides in a memory space 323 and is executable by one or more processors 321. The server device 320 also includes a network interface 324 to facilitate the communication between the server 320 and other devices on a network, and a local storage space 325. The server module 322 is an executable version of one embodiment of the present invention and delivers, when executed, features/results contemplated in the present invention. According to one embodiment, the server module 322 comprises an administration interface 326, an account manager 328, a system parameter manager 330, a user monitor 332, a local server manager 334, a partner access manager 336, an access report manager 338, and a rules manager 339.

Administration Interface 326:

As the name suggests, the administration interface 326 facilitates a system administrator to register users and grant respective access privileges to the users and is an entry point to the server module from which all sub-modules or the results thereof can be initiated, updated and managed. In one embodiment, the system administrator sets up hierarchy access levels for various active folders, storage locations, users or group of users. The privileges may include, but not be limited to: open, read, write, print, copy, download and others. Examples of the other privileges are: altering access privileges for other users, accessing secured documents from one or more locations, and setting up a set of access rules for a folder different from those previously set up (perhaps by the system administrator). The respective user IDs assigned to the users facilitate the management of all the users. Unless specifically stated differently, a user or a corresponding user ID is interchangeably used herein to identify a human user, a software agent, or a group of users and/or software agents. Besides a human user who needs to access a secured document, a software application or agent sometimes needs to access the secured document in order to proceed forward. Accordingly, unless specifically stated, the "user" as used herein does not necessarily pertain to a human being. In general, a user that will access a secured document is associated with a user key to allow an encrypted header in a secured document to be unlocked (decrypted). The expiration or regeneration of a user key may be initiated by the system administrator. According to one embodiment, the administration interface 326 is a user graphic interface showing options for various tasks that an authenticated system administrator or operator may need to perform.

Account Manager 328:

Essentially, the account manager is a database or an interface to a database 327 (e.g., an Oracle database) maintaining all the registered users and their respective access privileges, and perhaps corresponding user keys (e.g., private and public keys). In operation, the account manager 328 authenticates a user when the user logs onto the server 320 and also determines if the user can access secured documents from the location the user's current location.

System Parameters Manager 330:

This module is configured to manage system parameters within the server module 322. These system parameters include, for example, user access privileges, system rules, and one or more keys. The system parameters manager 330 can be used to add, delete or modify any of the system parameters. The system parameters manager 330 can also interact with local modules and client modules to supply the system parameters to these distributed modules. For example, a user key can be expired (deleted) for security reasons when a user leaves the organization or when its time to replace the user key. As another example, a file key may be rotated on a periodic or on-demand basis. The system parameters can be supplied to local modules and client modules by a "push" of system parameters to the other distributed modules or by a response to a "pull" request for updated system parameters. Optionally, the system parameters manager 330 may be further configured to act as a key manager managing all keys used in the security system.

User Monitor 332:

This module is configured to monitor user's requests and whereabouts. Typically, a user is granted to access secured documents from one or more designated locations or networked computers. If a user has a higher access privilege (e.g., to permit access from other than the locations or networked computers), the user monitor 332 may be configured to ensure that the user can have only one access from one of the registered locations or computers at all times. In addition, the user monitor 332 may be configured and scheduled to interact with the system parameters manager 330 to "push" an update of system parameters or respond to a "pull" request for an update of system parameters.

Local Server Manager 334:

This module is designed to be responsible for distributing an appropriate local module for a local server servicing a predetermined location or a predetermined group of users. According to one embodiment, the local server manager 334 replicates some or all of the server module 322 being executed on the server 320 and distributes the replicated copy to all the local servers. As a result, a user can access secured documents anywhere within the network premises covered by the local servers without being authenticated at a single central server, namely the server 320. According to another embodiment, the local server manager 334 replicates some of the server module 322 being executed on the server 320 and distributes the replicated copy to a corresponding local server. In this embodiment, each of the local servers will have its own customized replication from the server module 322.

Partners Access Manager 336:

A special module to manage non-employees accounts. The non-employees may be consultants to a business that requires the consultants to access certain secured documents. The partners access manager 336 generally works in accordance with other modules in the server but puts additional restrictions on such users being directly managed by the partners access manager 336. In one application, the partners access manager 336 generates a request to the user key manager 330 to expire a key or key pair for a consultant when an engagement with the consultant ends.

Access Report Manager 338:

A module is configured to record or track possible access activities and primarily works with a corresponding sub-module in a client module being executed in a client machine. The access report manager 338 is preferably activated by the system administrator and the contents gathered in the access report manager 338 and is typically only accessible by the system administrator.

Rules Manager 339:

In general, the rules manager 339 is an enforcement mechanism of various access rules. According to one aspect, the rules manager 339 is configured to specify rules based on i) data types (e.g., Microsoft Word), ii) group users or individual, iii) applicable rights, and iv) duration of access rules. Typically, a set of rules is a policy (namely, a security policy). A policy can be enabled, disabled, edited, deployed and undone (e.g., one or two levels). Policies managed by the rules manager 339 operate preferably on a global level. The rules (as well as other system parameters) are typically downloaded to the client machine during the login process (after the user is authenticated) and can be updated dynamically. In addition, respective policies may be associated with active folders (i.e., those designated places to store secured documents). These polices are also downloaded and updated on the client machine. Simple policies can also be embedded in the document and provide document specific policies.

According to one embodiment, a header is received by a local server from a client and the access rules from the header are retrieved. The key manager 330 can be called upon to decrypt the encrypted security information in the header. The rules manager 339 can then parse the access rules from the security information and evaluate or measure the access rules against the access privileges of the user to determine whether the secured document can be accessed by the user. If the evaluation or measurement succeeds, a file key is retrieved and sent back to the client.

It should be pointed out that the server module 322 in FIG. 3B lists some exemplary modules according to one embodiment of the present invention and not every module in the server module 322 has to be implemented in order to practice the present invention. Those skilled in the art can understand that given the description herein, various combinations of the modules as well as modifications thereof without departing the spirits of the present invention, may achieve various desired functions, benefits and advantages contemplated in the present invention.

Figure 3C:
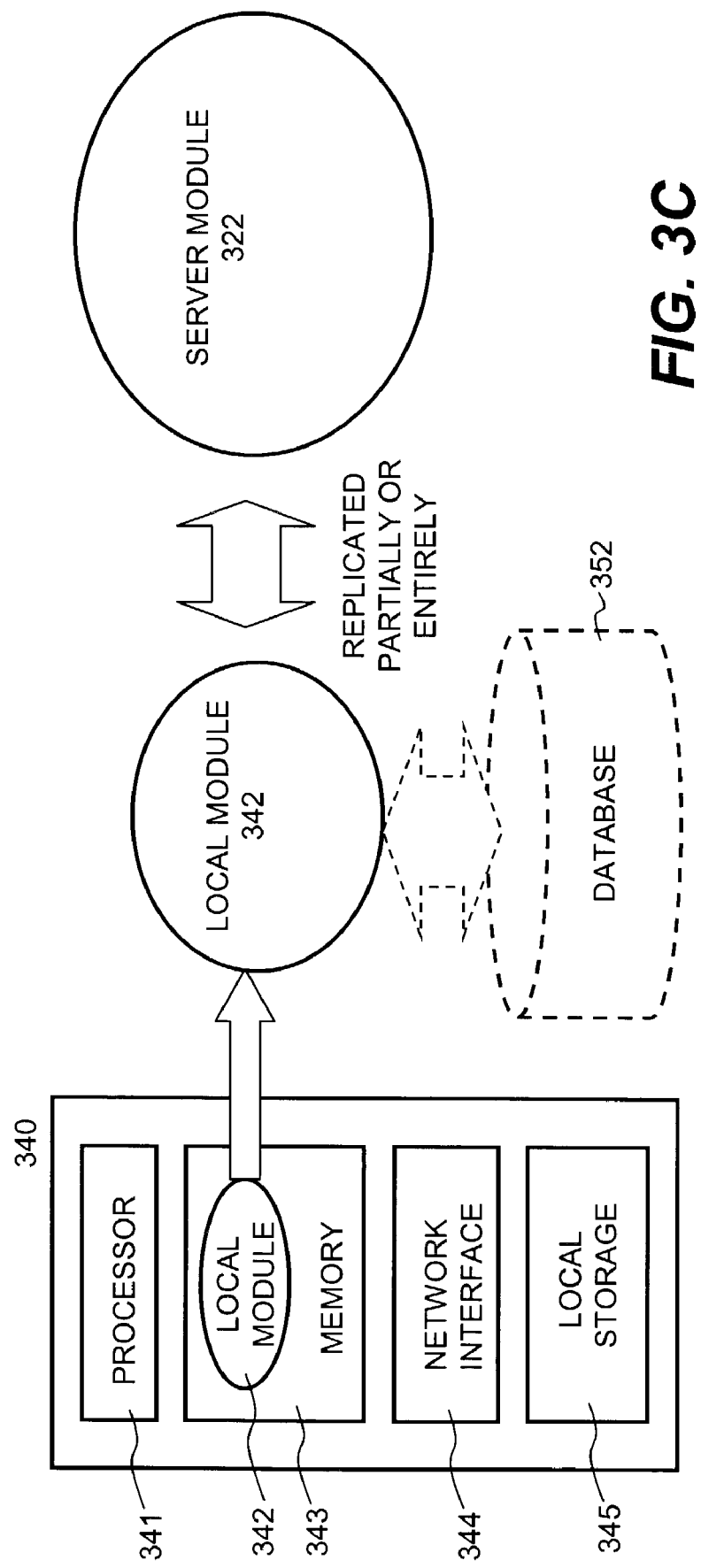
FIG. 3C is a functional block diagram of a local server device according to one embodiment of the invention.

FIG. 3C shows a functional block diagram of a local server device 340 according to one embodiment of the invention. The local server device 340 executes a module, referred herein as a local module 342 which is configured to be a complete or partial replication of the server module 322 of FIG. 3B. The local server device 340 is generally similar to that of a server as illustrated in FIG. 3B. Namely, the local server device 340 includes one or more processors 341, a memory space 343, a network interface 344, and a local storage space 345. Given the similarity, many parts illustrated in FIG. 3C are not to be described again to avoid obscuring aspects of the present invention. The local module 342 provides the dependability, reliability and scalability of the centralized access control management being undertaken by the central server 320 of FIG. 3B. As such, not all authentication requests need to be handled at one central point without losing control of the access control management. The users are thus not affected if the central server is brought down for maintenance and the connection to the central server is not available. If a number of local servers are used and each has a replication of the server module, the reliability of servicing the users is greatly enhanced. As a result, the local users need only to check with the corresponding local server and none of the users would be affected if other local servers are down for whatever reasons or disconnected from the central server.

The configuration of a user's access to secured documents is sometimes referred to as a provisioning process. The dynamic provisioning that has been described above is believed to provide the necessary security means needed by a large enterprise having employees in several locations without the loss of the centralized access control management at a central server. Further, the use of multiple local servers to support the central server can provide increased dependability, reliability and scalability.

Referring now to FIG. 3D, there is shown a functional block diagram of a client machine 360 according to one embodiment of the invention. As used herein, the client machine 360 is a computing device primarily used by a user to access secured documents. The client machine 360 can, for example, be a desktop computer, a mobile device or a laptop computer. According to one embodiment, the client machine 360 includes a processor 361, a client module 362, a memory space 363, a network interface 365 and a local store 367. The client module 362 resides in the memory space 363 and, when executed by the processor 361, delivers features, advantages and benefits contemplated in the present invention. Through the network interface 365, the client machine 360 is capable of communicating over a data network with other computers, such as a server. From the client machine 360, a user can access secured documents located in a repository (store) 366 that may be in the client machine 360, another networked device, or other storage means. According to one embodiment, the client module 362 includes a number of sub-modules including an access report module 364, a user verifying module 370, a key manager 368, a document securing module 371 and an off-line access manager 374.

Access Report Module 364:

This module is a software agent configured to record access activity and associated with an authenticated user. It reports to an access report module in the central server so that a record may be established as to what secured document has been accessed by which user during what time. In particular, the access report module 364 can be activated to capture access activities of the user when the client machine is not networked. The access activities will be later synchronized with the counterpart in the server to facilitate the access control management for the offline access.

Key Manager 368:

One of the purposes for the key manager 368 is to ensure that a secured document is still usable when the secured document is being accessed by an application that suddenly crashes. According to one embodiment, after the encrypted header is decrypted, the file key is then copied or a copy thereof is stored (cached) into the key manager 368. The file key is then used to decrypt the encrypted document. A clear document is now available to the application. If the application crashes due to power outage or interfered by another application or OS, the file key in the header could be damaged. If no copy of the file key is available, the secured document may not be usable any more because the encrypted document would not be decrypted without the file key. In this case, the reserved key maintained in the key manager 368 can be used to replace the damaged key and decrypt the encrypted document. After the user saves the file again, the file key is put back into the header. Another purpose for the key manager 368 is to cache other keys (e.g., user key(s)) for use in accessing secured documents.

User Verifying Module 370:

This module is responsible for determining if a user accessing a secured document has been authenticated otherwise it will initiate a request for authentication with a local server or a central server. In other words, the user verifying module 370 is always consulted before a permission is granted to the user seeking access to a secured document. According to one embodiment, a user key or keys of an authenticated user are stored (cached) in the key manager 368 once the user is authenticated by the user verifying module 370 via the server. When a secured document is accessed, the user key must be retrieved from the key manager 368 to decrypt the encrypted security information in the header of the secured document.

Document Securing Module 371:

As described above, the DSM 371 includes a cipher 372 that is used to generate a file/user key and encrypt/decrypt a document/header. In addition, other securing means may be implemented in the DSM 371, for example, a filter to block copying contents in a secured document into a non-secured document or a link from a secured document/original source to another document or recipient source.

Off-Line Access Manager 374:

This module becomes effective only when the networked client machine is off the network, namely, the communication with a local server or a central server is not currently available. For example, a user is on the road and still needs to access some secured documents in a laptop computer. When live consultation is not available, the off-line access manager 374 is activated to ensure that the authorized user still can access the secured document but only for a limited time and perhaps with a limited privilege.

It should be pointed out that the client module 362 in FIG. 3D lists some exemplary sub-modules according to one embodiment of the present invention and not every module in the server module 362 has to be implemented in order to practice the present invention. Those skilled in the art can understand that given the description herein, various combinations of the sub-modules, may achieve certain functions, benefits and advantages contemplated in the present invention.

According to one aspect of the invention, keys that are used to secure files can use arbitrary strings. Such keys are preferably public keys (also known as identity based public keys) that are used to encrypt files (or documents). Specifically, the public keys are arbitrary strings that embed or encode identifiers to access restrictions (or access rules). The access restrictions are used to enforce access control policies. Counterpart private keys are used to decrypt the files that have been previously encrypted with the public keys. The private keys can be generated to decrypt the portions of the files that have previously been encrypted with the public keys.

Because the public keys are based on arbitrary strings, the public keys and their private key counterparts are able to be generated in a decentralized manner (as well as in a centralized manner). The ability to generate keys in a decentralized manner substantially eliminates key distribution burdens and facilitates off-line access to encrypted files. However, given that the public keys are identifiers for access restrictions (e.g., access rules), the secured files contain only the identifiers as opposed to the often complicated access restrictions. As a result, the access restrictions (e.g., access rules) are not directly contained in secured files but are instead centrally stored and pointed to by the identifiers. In the embodiments discussed below, the public keys which are arbitrary strings are preferably used as file keys to secure files. Often, the file keys are symmetric keys. However, in other embodiments, arbitrary strings can be used with other public keys besides file keys. Such other public keys might, for example, be associated with user keys (also known as a group key when the key pertains to a group of users), clearance keys, or protection keys.

Figure 4:
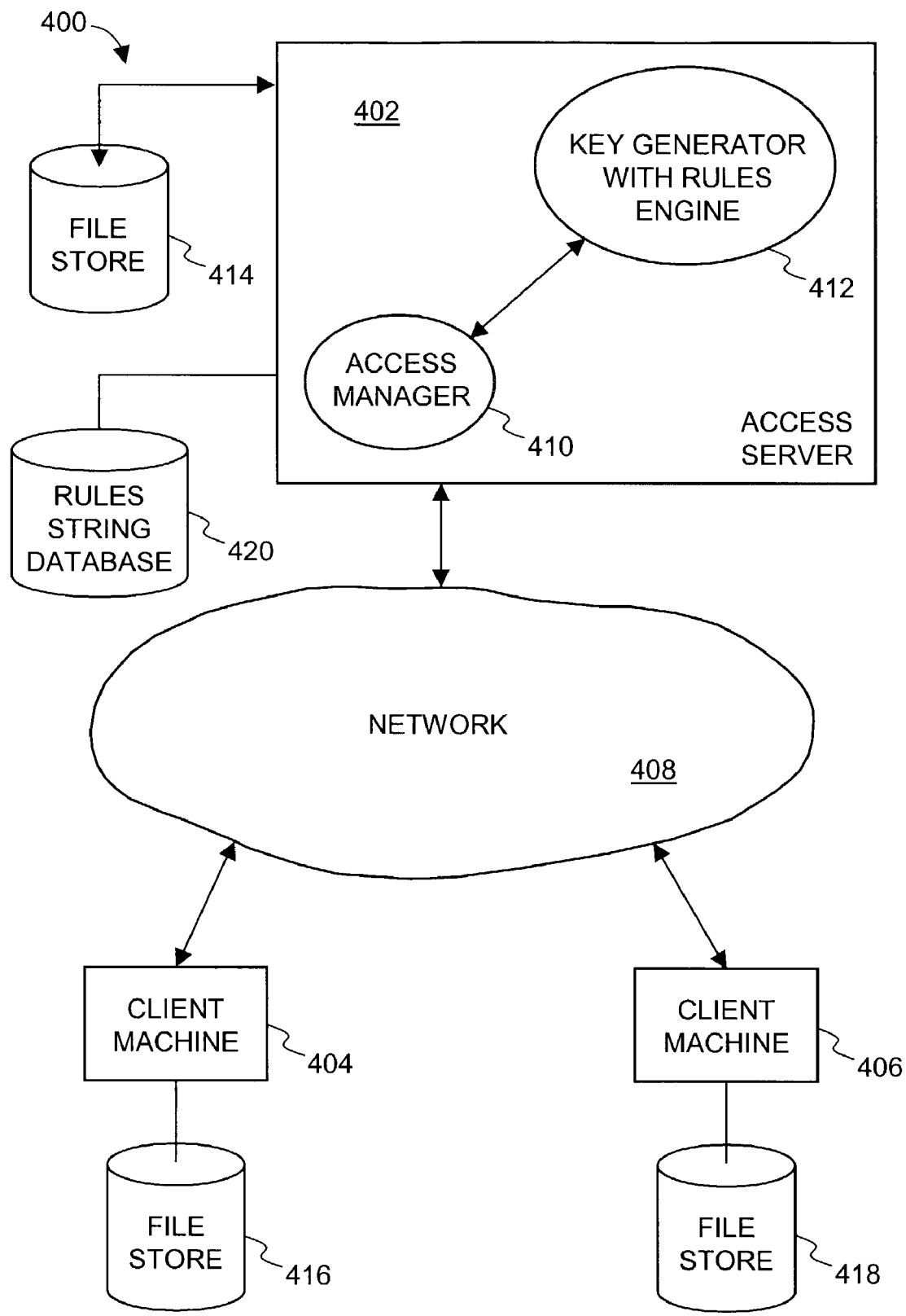
FIG. 4 is a block diagram of a distributed file security system according to one embodiment of the invention.

FIG. 4 is a block diagram of a distributed file security system 400 according to one embodiment of the invention. The file security system 400 includes an access server 402 and client machines 404 and 406. The access server 402 can pertain to a local server or a central server as noted above with respect to FIGS. 1A-1C. The access server 402 couples to a network 408, and the client machines 404 and 406 also couple to the network 408. The network 408, for example, can pertain to one or more of the Internet, a wide area network, a local area network, etc.

The access server 402 includes an access manager 410 and a key generator 412 with a rules engine. The access manager 410 provides centralized control for management of user access to secured files. The secured files can be associated with the access server, such as stored in a file store 414, or associated with client machines 404 and 406 and stored in file stores such as file store 416 or file store 418.

In securing files, a public key is used. According to one aspect of the present invention, an identifier, or an encoded identifier, for a rules string is used as a public key. A rules string database 420 centrally stores a plurality of different rules strings. Each of the different rules strings can embed different access rules. The rules string database 420 can, for example, be accessed by the access server 402. Hence, when a file is to be secured, a user determines appropriate access rules for the file. A rules string is then formed from the access rules. Assuming that an identical rules string and associated identifier do not already exist, an identifier is created and used to point to the rules string which is stored in the rules string database 420. The identifier can be encoded to include or exclude information about date of creation, physical location in central storage, position in sequence of generated identifiers, or other information, as may be deemed appropriate. Thereafter, regardless of any further encoding, the identifier serves as a public key for use in encrypting the file. Accordingly, at least a portion of the file can be secured using the public key. Given that the rules string database 420 provides central storage for various rules strings, if desired, multiple identifiers can point to a single rules string in the rules string database 420 or like identifiers can be used with different files. It follows that rule strings can be modified without prior knowledge of, or access to, any or all files secured with identifiers to such rule strings, as previously described.

The processing for decrypting secured files is also performed by the file security system 400. The access manager 410 communicates with the key generator 412 to decide whether a particular user is granted access to a secure file. The secured file contains a public key associated with the secured file. The public key is an identifier for a rules string. The rules string associated with the identifier is accessed from the rules string database 420. The key generator 412 within the rules engine can then evaluate the rules (e.g., access rules) that are associated with (e.g., embedded or encoded within) the rules sting. If the rules engine determines that the access requested is permitted, then the key generator 412 generates a key (e.g., private key) that can be utilized in gaining access to the secure file. The generated key is supplied to the access manager 410. The access manager 410 can either gain access to the secured file using the generated key or can supply the generated key to the appropriate client machine which in turn gains access to the secured file using the generated key. In one embodiment, the generated key can be referred to as a file key.

The various processing operations performed in encrypting or decrypting a file with respect to the file security systems 400 shown in FIG. 4 can largely be performed at either the access server 402 or the client machines 404 and 406. Given that the rules strings are centrally stored in a rules string database, access to the rules string database is needed. However, by locally caching at a client machine those rules strings previously retrieved from the rules string database, one can improve performance and minimize the need for network access or connectivity. On the other hand, performing the aforesaid processing operations at the access server 402 precludes the need for even momentary presence of a sensitive master key at the client machine.

Figure 5:
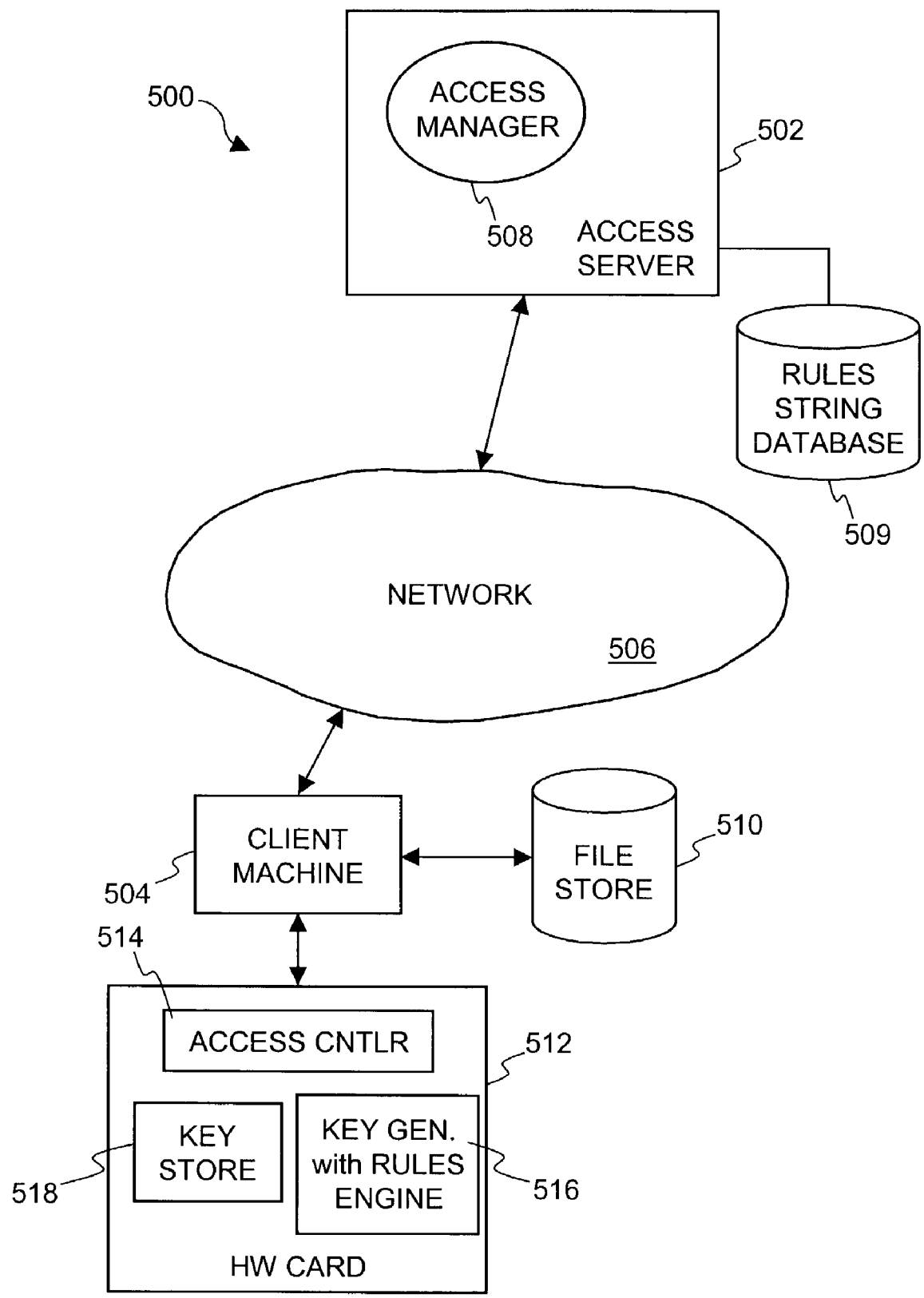
FIG. 5 is a block diagram of a distributed file security system according to one embodiment of the invention.

FIG. 5 is a block diagram of a distributed file security system 500 according to one embodiment of the invention. The distributed file security system 500 distributes security operations to local client machines to distribute processing load as well as to reduce key transfer and distribution across networks.

The distributed file security system 500 includes an access server 502 and a representative client machine 504 coupled through a network 506. The access server 502 includes at least an access manager 508 that controls access to secure files managed by the distributed file security system 500. The access server 502 also couples to a rules string database 509. The rules string database 509 stores one or more rules strings. The client machine 504 couples to a file store 510 where secured files are stored. In addition, the client machine 504 couples to a hardware (HW) card 512 (e.g., a smart card). The hardware card 512 is, more generally, a peripheral device coupled to the client machine 504. As illustrated in FIG. 5, the hardware card 512 includes an access controller 514, a key generator with rules engine 516 and a key store 518.

To secure a file, a public key is used. A user determines appropriate access rules for the file. A rules string is then formed from the access rules. An identifier is created and used to point to the rules string which is stored in the rules string database 509. The public key is an identifier, or an encoded identifier, for a rules string. The identifier locates, indexes or points to one of a plurality of different rules strings stored in the rules string database 509. Hence, when a file is to be secured, the identifier (possibly encoded) serves as a public key for use in encrypting the file.

When a user of the client machine 504 desires to access a secured file that is managed by the distributed file security system 500, the user of the client machine 504 is typically first authenticated by the access manager 508 of the access server 502. Then, an identifier for a rules string having access rules is used as a key (namely, public key) to access the secured file. The appropriate rules string is obtained from the rules string database 509 using the identifier. The key generator with rules engine 516 within the hardware card 512 receives the rule string and evaluates whether the user has sufficient privileges to access the secured file in view of the rules embedded within the rules string. When the key generator with rules engine 516 determines that the user is permitted access to the secured file, the access controller 514 produces a private key which is used to decrypt the secured file. The private key can also be stored to the key store 518. In this embodiment, the private key preferably resides within the hardware card 512 and thus is not transmitted beyond the hardware card 512. In other words, the private key is not stored on the client machine 504, nor does the client key traverse the network 506 to be stored in the access server 502.

Figure 6:
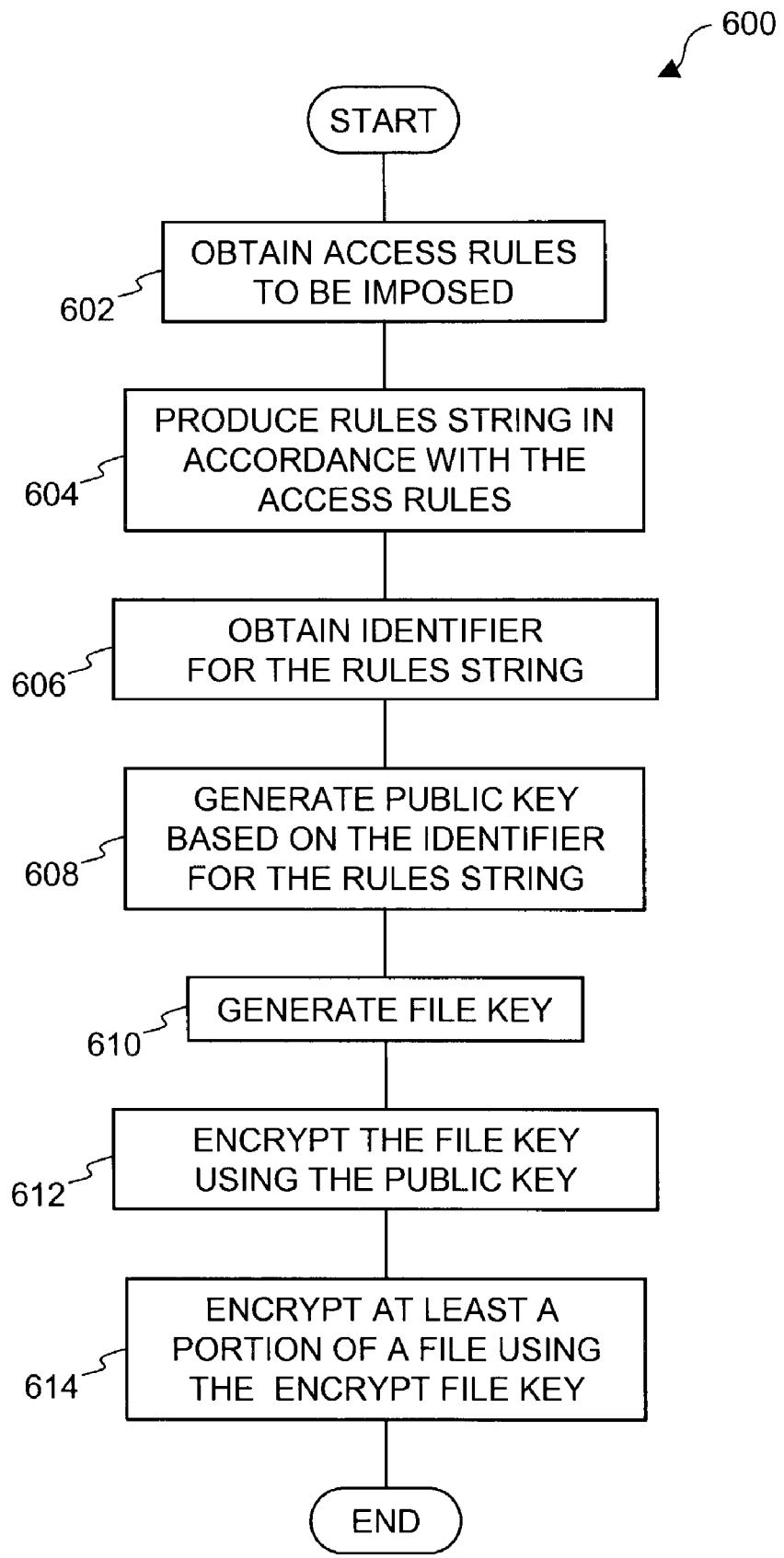
FIG. 6 is a flow diagram of indirect access rules based encryption processing according to one embodiment of the invention.

FIG. 6 is a flow diagram of indirect access rules based encryption processing 600 according to one embodiment of the invention. The indirect access rules based encryption processing 600 is, for example, performed by an access server, such as the access server 402 illustrated in FIG. 4 or the access server 502 illustrated in FIG. 5. The access server can represent a central server or a local server of a security system. The access server can also represent the server device 104, 106 illustrated in FIGS. 1A and 1B. Some or all of the indirect access rules based encryption processing 600 can be performed at the client machines 404, 406 of FIG. 4 or the client machines of FIGS. 1A-1C, 4 and 5.

The indirect access rules based encryption processing 600 initially obtains 602 access rules to be imposed. Namely, the access rules to be imposed are those access rules that are to be applied in securing a file. Next, a rules string is produced 604 in accordance with the access rules.

In one embodiment, the rules string can follow a predetermined format to embed the access rules. Although the rules string can vary, one example of a rules string is "9:00 am to 5:00 pm<Dec. 31, 2002" which encodes access rules that indicate that access to the associated secured file is only permitted between 9:00 am and 5:00 pm but only prior to Dec. 31, 2002. Another example is "10:00 am-2:00 pm on machine 10.200.255.213" which encodes access rules that indicate that access to the associated secured file is only permitted between 10:00 am and 2:00 pm from a machine having a specific network address. The rules string can also include an access rule that limits access to the secured file to certain groups of users. For example, a group "human resources" could be used in an access rule to limit access to personnel files to only those users that are deemed to be in the human resources group. Still another example is "Engineering, 9:00 am and 5:00 pm, Mon-Fri, off-line, MS-Word" which encodes access rules that indicate that access to the associated secured file is only permitted by a user of the Engineering group, between 9:00 am to 5:00 pm, Monday through Friday, when off-line and when using MS-Word.

Once the rules string has been produced 604, an identifier for the rules string is obtained 606. Typically, the identifier is a unique identifier that specifies a particular rules string. The identifiers for the rules strings can be retrieved (e.g., from a cache) if already used previously or can be generated as needed. According to one embodiment, an identifier is a unique character string that can be used to retrieve the rules string from centralized storage. In one implementation, an identifier is normally generated at the time of storage of a rules string, and can have as components one or more of a timestamp, a random number, an operating system process number, a sequence number, or other data.

Next, a public key is generated 608 based on the identifier for the rules string. In one embodiment, when generating the public key, the identifier is encoded. The encoding can, for example, exclude or include additional information about date of creation, physical location in central storage, position in sequence of generated identifiers, or other information, as may be deemed appropriate. In another embodiment, the identifier is used unchanged as the public key. Here, the securing of the file uses indirection such that the public key is derived from the identifier of the rules string which in turn includes the access rules. In other words, the public key is generated based on the identifier of the rules string. Consequently, the public key is thus not supplied by a key generator (which would require distribution of public/private key pairs). Moreover, the public key is generated from the identifier for the access rules. As a result, the access rules are only indirectly used in producing the public key. The indirection thus permits after the fact alteration of the access rules without having to alter the secure files.

In any case, after the public key is available, at least a portion of the file to be secured can be encrypted using the public key. Generally, in one embodiment, the portion of the file being encrypted 608 is a data portion of the file. More particularly, according to the indirect access rules based encryption processing 600, a double encryption technique can be used to provide enhanced security. According to the double encryption technique, a file key is generated (or obtained) 610. The file key is then encrypted 612 using the public key. The encrypted file key is then used to encrypt 614 at least a portion of the file. Once at least the portion of the file is encrypted 614, the indirect access rules based encryption processing 600 ends.

Figure 7:
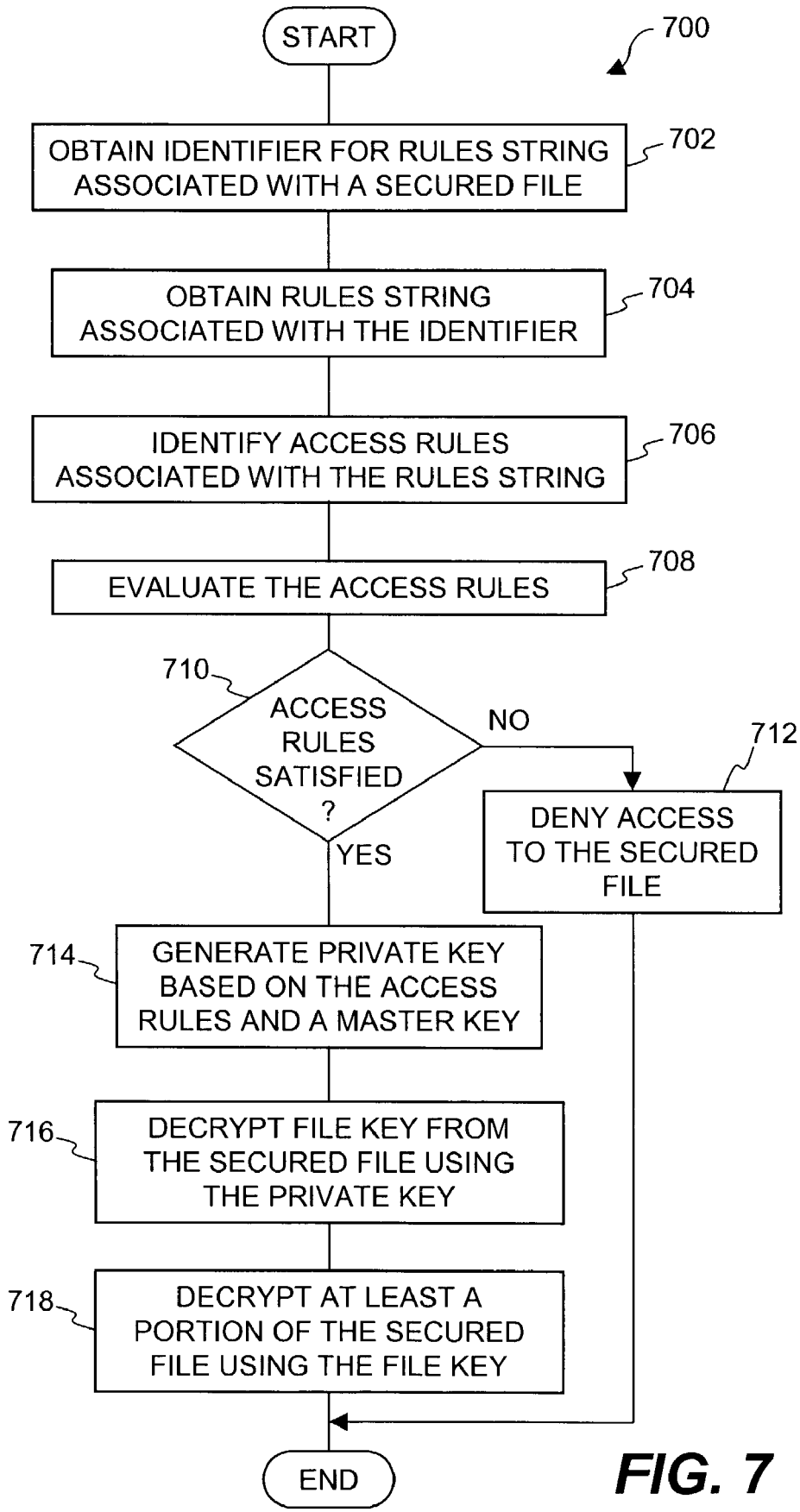
FIG. 7 is a flow diagram of indirect access rules based decryption processing according to one embodiment of the invention.

FIG. 7 is a flow diagram of indirect access rules based decryption processing 700 according to one embodiment of the invention. The indirect access rules based decryption processing 700 is performed in order to decrypt a file that has been previously encrypted (i.e., a secured file). The indirect access rules based decryption processing 700 is, for example, performed by an access server, such as the access server 402 illustrated in FIG. 4 or the access server 502 illustrated in FIG. 5. The access server can represent a central server or a local server of a security system. The access server can also represent the server device 104, 106 illustrated in FIGS. 1A and 1B. Some or all of the indirect access rules based decryption processing 700 can be performed at the client machines 404, 406 of FIG. 4 or the client machines of FIGS. 1A-1C, 4 and 5.

According to the indirect access rules based decryption processing 700, an identifier for a rules string that is associated with the secured file is obtained 702. Then, a rules string associated with the identifier is obtained 704. Next, access rules associated with the rules string are identified 706. In one embodiment, the access rules can be embedded in the rules string. The access rules are then evaluated 708. A decision 710 then determines whether the access rules are satisfied. Here, the access rules can be compared against access privileges associated with the requestor (i.e., user) that desires access to the secured file. These access rules are not only indirectly used to formulate a public key, but also used to determine whether the requestor has sufficient privileges and rights to satisfy the access rules and thus gain access to the secured file.

When the decision 710 determines that the access rules are not satisfied, then access to the secured file is denied 712. On the other hand, when the decision 710 determines that the access rules are satisfied, then a private key is generated 714 based on the access rules and a master key. After the private key has been generated 714, at least a portion of the secured file can be decrypted using the private key. More particularly, if the secured file was previously encrypted using a double encryption technique, then the decryption of the secured file can be more involved. In one such embodiment, the secured file is decrypted 716 using the private key to produce a file key. At least a portion of the secured file can then be decrypted 718 using the file key. The portion of the secured file being decrypted is, for example, a data portion of the secured file. Following the operation 718, as well as following the operation 712, the indirect access rules based decryption processing 700 ends.

Figure 8:
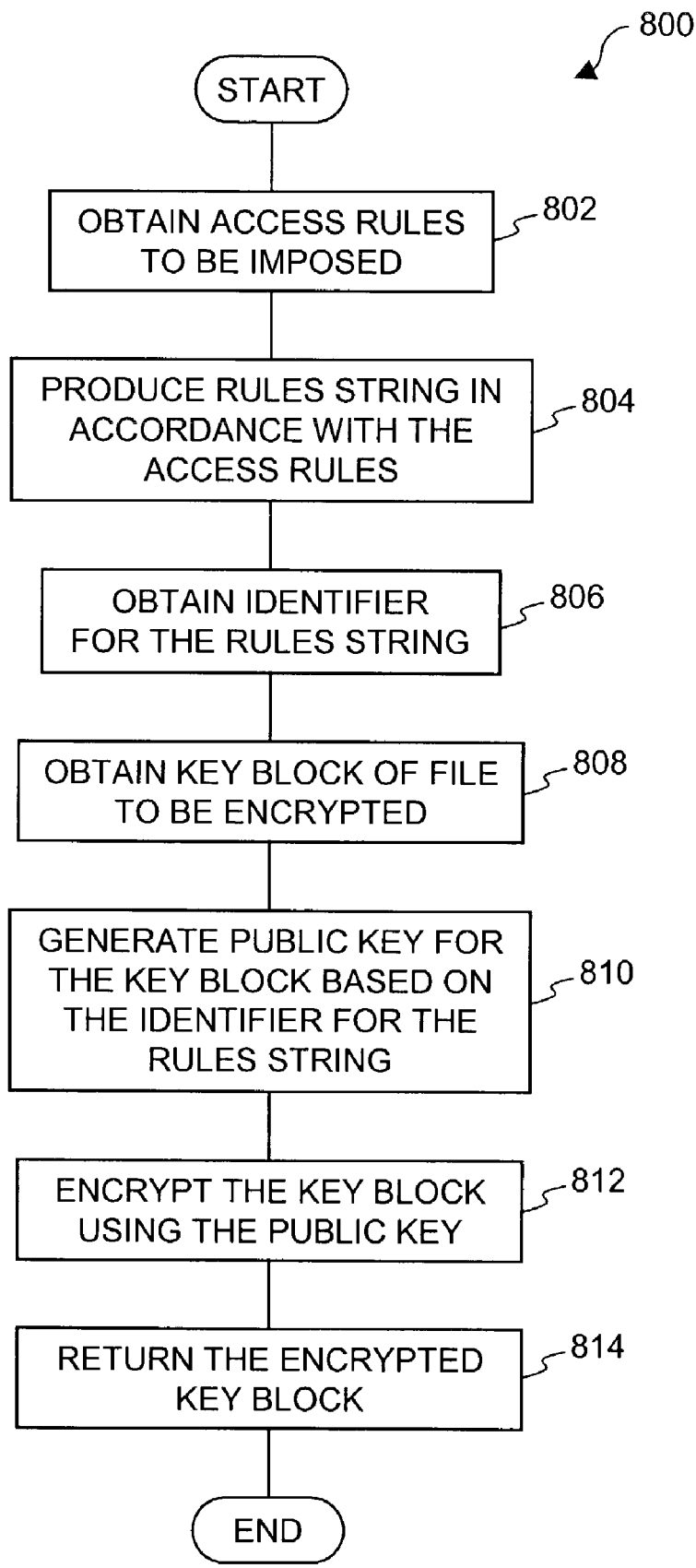
FIG. 8 is a flow diagram of indirect access rules based encryption processing according to another embodiment of the invention.

FIG. 8 is a flow diagram of indirect access rules based encryption processing 800 according to another embodiment of the invention. The indirect access rules based encryption processing 800 is, for example, performed by a distributed file security system, such as the distributed file security system 500 illustrated in FIG. 5.

The indirect access rules based encryption processing 800 initially obtains 802 access rules to be imposed when securing a file. Next, a rule string is produced 804 in accordance with the access rules. As noted above with respect to FIG. 6, the rules string can follow a predetermined format to embed the access rules. Next, an identifier for the rules string is obtained 806. The identifier serves to represent the rules string. A key block of the file to be encrypted (or secured) can be obtained 808. In one embodiment, a key block is a part of a header of a file format for the file, such header includes one or more keys that are used to decrypt data within a data portion of the file format.

A public key for the key block is generated 810 based on the identifier for the rules string. Here, the public key is able to be relatively easily generated given that it is based on the rules string. In other words, the public key can be generated without requiring the generation of a private/key pair and without the need to distribute such keys. Still further, since the public key is generated based on the identifier for the rules string, the public key is not directly dependent on the rules string. This facilitates central management (e.g., alteration) of rules strings which indirectly serve as public keys. After the public key for the key block has been generated 810, the key block of the file is then encrypted 812 using the public key. The encrypted key block is then returned 814 to the requesting device. The encrypted key block is then able to be affixed to the encrypted data portion of the secured file. For example, the encrypted key block can form part of the security information of the header portion of the secured file. In one embodiment, the data portion was previously encrypted using the one or more keys within the key block.

Figure 9:
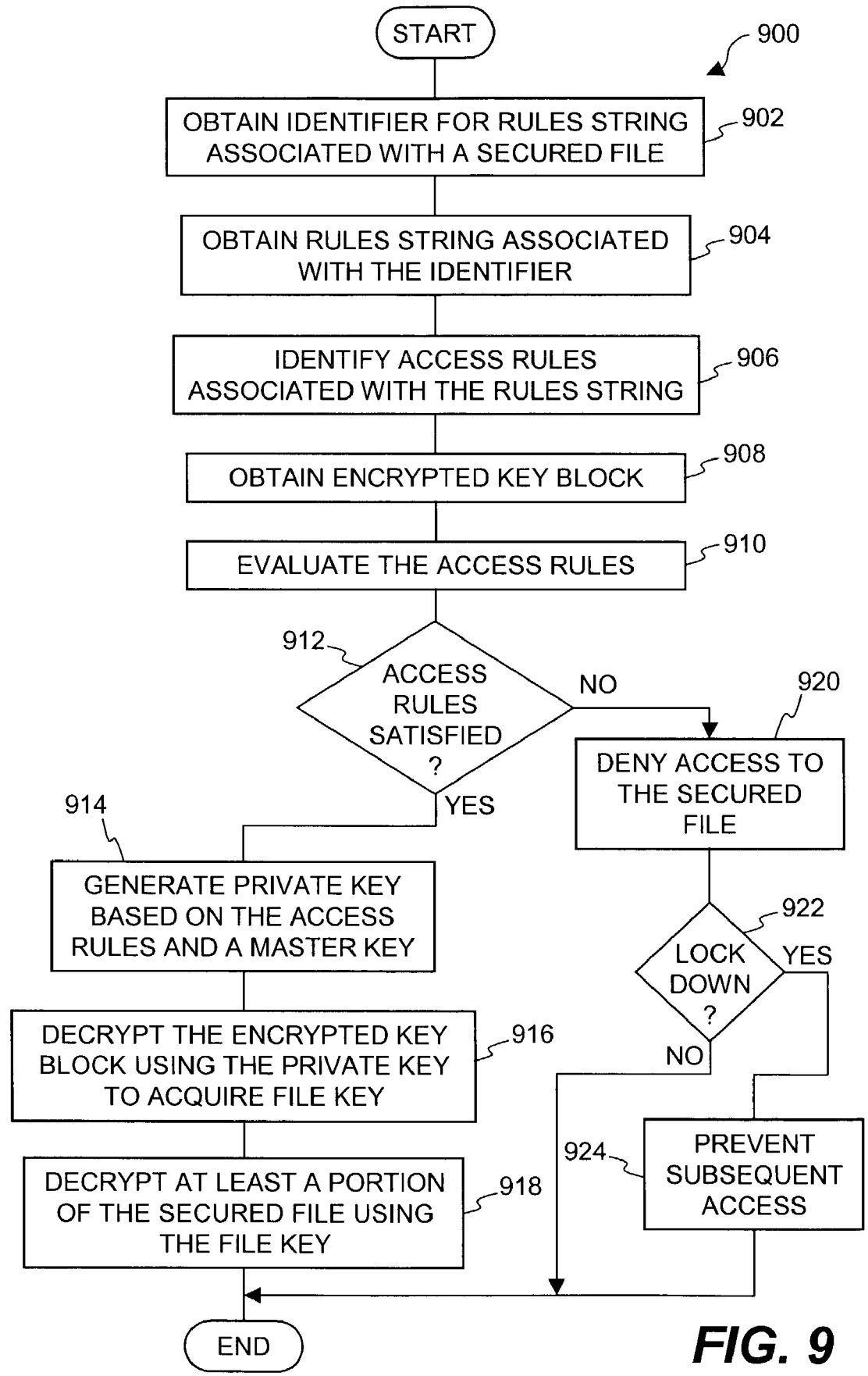
FIG. 9 is a flow diagram of indirect access rules based decryption according to one embodiment of the invention.

FIG. 9 is a flow diagram of indirect access rules based decryption processing 900 according to one embodiment of the invention. The indirect access rules based decryption processing 900 is performed in order to decrypt a file that has been previously encrypted (i.e., secured file).

The indirect access rules based decryption processing 900 initially obtains 902 an identifier for rules string associated with a secured file. The rules string associated with the identifier is then obtained 904. The rules strings may have been obtained from a local cache, if such caching is permitted, and of the document had been accessed previously. Next, access rules associated with the rules string are identified 906. An encrypted key block is also obtained 908. After the access rules have been identified 906, the access rules within the rules string are evaluated 910. A decision 912 determines whether the access rules are satisfied. When the decision 912 determines that the access rules are satisfied, then a private key is generated 914 based on the access rules and a master key. Then, the encrypted key block is decrypted 916 using the private key to acquire a file key. Thereafter, the file key is utilized to decrypt 918 at least a portion of the secured file using the file key. In one embodiment, at least a portion of the secured file being decrypted 918 pertains to a data portion of the secured file.

On the other hand, when the decision 912 determines that the access rules are not satisfied, then access to the secured file is denied 920. Additionally, after access to the secured file has been denied 920, additional processing can be performed to restrict unauthorized users from making additional requests to access secured files. Following the operations 918 and 920, the indirect access rules based decryption processing 900 is complete and ends.

The results of the access rules based decryption processing 700, 900 can be considered a clear file (i.e., decrypted file or decrypted data portion). The clear file refers to the fact that the previously secured file is no longer secured, and is thus usable. The clear file can be returned to the requestor. Nevertheless, the processing described above with respect to the indirect access rules based decryption processing 700, 900 shown in FIGS. 7 and 9 is typically preceded by authorization processing. Authorization processing operates to authenticate the user seeking access to a secured file.

A master key is used to generate a private key. Hence, access to the master key must be restricted. In one embodiment, the master key is generated or regenerated based on gathered information. The gathered information can be considered a seed to generate a master key or the master key may itself be distributed among a central server, one or more local servers, and a local device (e.g., a smart card or simply a local client machine). In other words, generation of the master key or acquisition of the master key may be shared among different machines, none could act alone to obtain the master key to proceed with the processes described herein. In one embodiment, a segment of the information is stored in the central server, another segment of the information is stored in a local server and a third segment of the information is stored in the local device (client machine). Only under the condition that the user is authenticated by the server (the central or local server), can the distributed segments of the information be gathered together to generate the master key or recover the master key. Further, the recovered or generated master key can, for example, also be configured to be valid for a certain period of time or for a fixed number of uses to enhance the security thereof.

Figure 10:
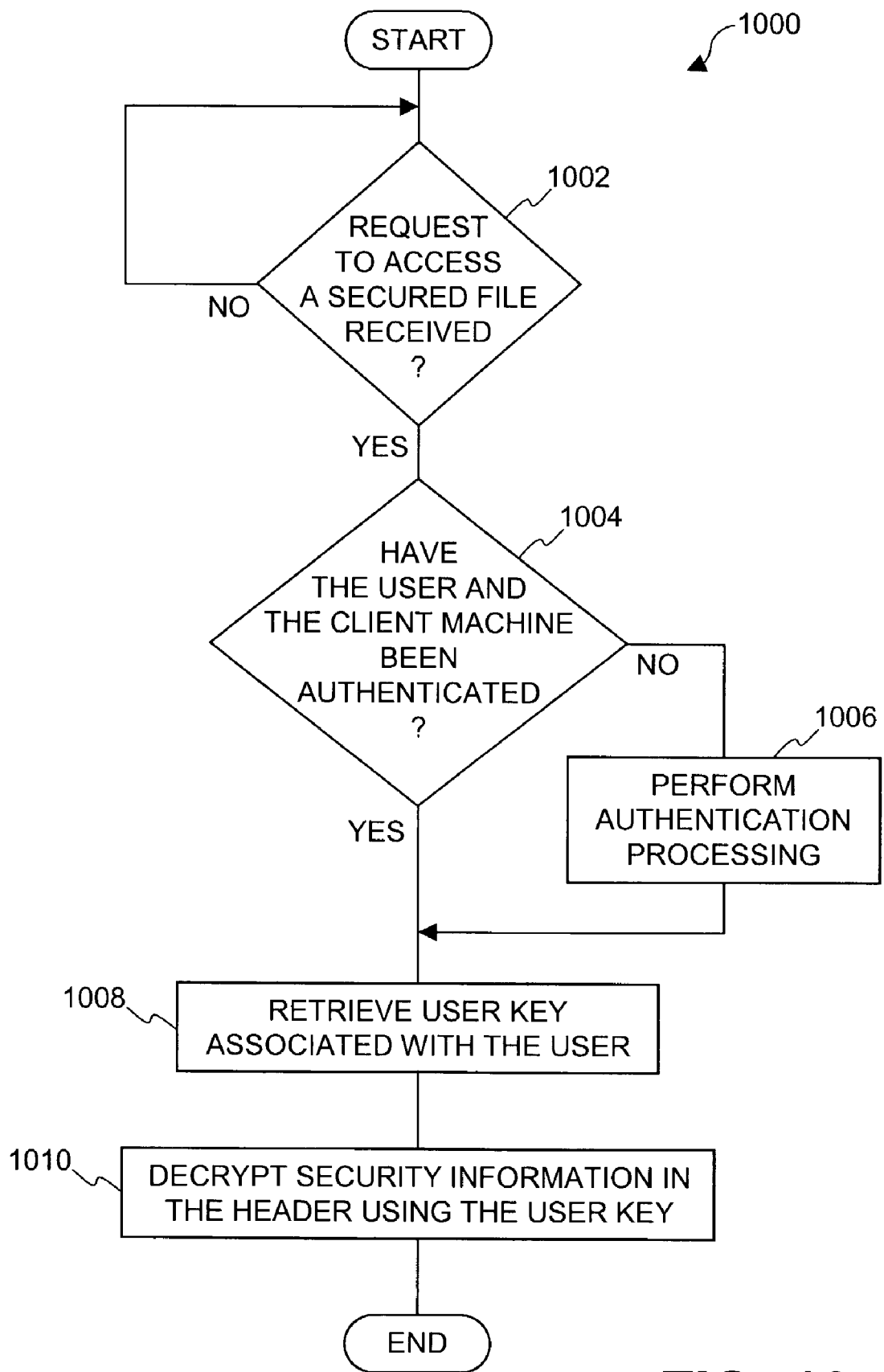
FIG. 10 illustrates flow diagrams of an authorization process according to one embodiment of the invention.

FIG. 10 illustrates flow diagrams of an authorization process 1000 according to one embodiment of the invention. The authorization process 1000 begins with a decision 1002 that determines whether a request to access a secured file has been received. When the decision 1002 determines that such a request has not yet been received, the authorization process 1000 waits for such a request. In other words, the authorization process 1000 can be considered to be invoked when a request to access a secured file is received.

Once the decision 1002 determines that a request to access a secured file has been received, a decision 1004 determines whether the user and/or the client machine have been authenticated. Typically, the request is initiated by a user of a client machine. For security, both the user and the client machine are authenticated. When the decision 1004 determines that both the user and the client machine have not yet been authenticated, then authentication processing is performed 1006. The authentication processing that is performed 1006 serves to not only authenticate that the user is who the user claims he or she is, but also to determine that the client machine that the user is utilizing is one authorized to be used by the user. In the event that authentication were to be unsuccessful, the authorization process 1000 would end and the user would be unable to access the secured file. Additional details on authentication processing are provided below with reference to FIG. 11.

On the other hand, when the decision 1002 determines that the user and the client machine have already been authenticated, as well as after the authentication processing has been performed 1006, a user key associated with the user is retrieved 1008. The user key can be retrieved 1008 from a storage location that is local or remote with respect to the computing device performing the authorization process 1000. After the user key has been retrieved 1008, part or all of the security information in the header portion of the secured file can be decrypted 1010 using the user key. As noted above, the secured file includes a header and a data portion. The header can include, among other things, security information. One component of the security information for the secured file is a file key. The file key can be used to decrypt the data portion of the secured file. Hence, after the security information in the header is decrypted 1010 using the user key, the authorization processing 1000 is complete and ends.

Figure 11:
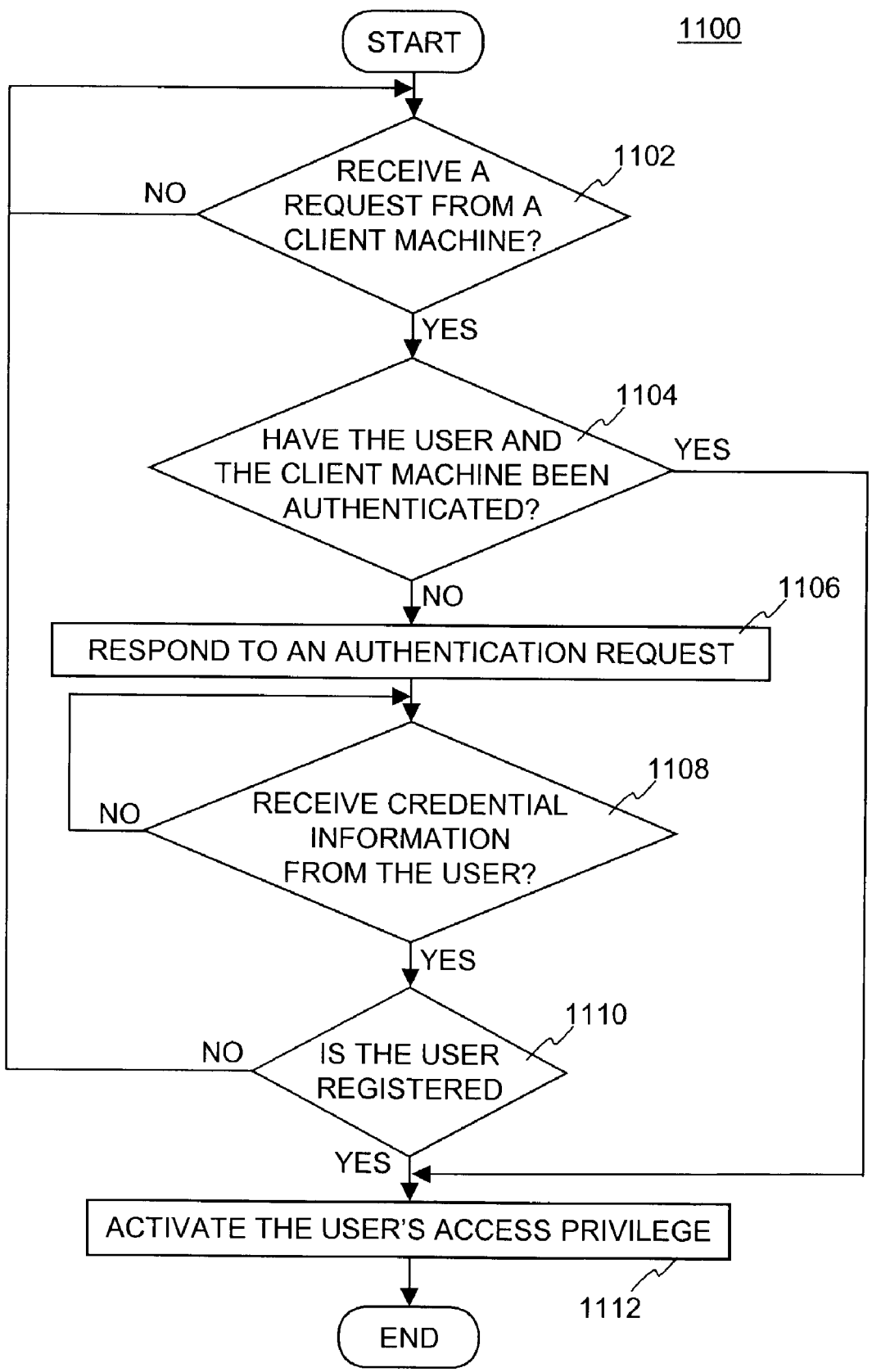
FIG. 11 shows a flowchart of a user authentication process that may be implemented in a server, such as an access server, a central server or a local server.

FIG. 11 shows a flowchart of a user authentication process 1100 that may be implemented in a server, such as an access server, a central server or a local server. As described above, there are at least two situations that will call upon the user authentication process 1100—initial login to a networked client machine and first access to a secured document. When either of these situations happens, a client module in the client machine initiates a request that is transmitted to a server running a module providing the access control management to start the user authentication process 1100.

At a decision 1102, the server awaits a request (e.g., authentication request) from the client machine. Upon receiving the request from the client machine, the server proceeds at a decision 1104 to determine if the user and the client machine from which the user attempts to access a secured document have already been authenticated. If both have already been authenticated, processing skips to operation 1112. On the other hand, the authentication processing 1100 continues when the decision 1104 determines that the user and the client machine have not already been authenticated. In one embodiment, the server may initiate a secured link with the client machine if both the server and the client machine are coupled to an open network, such link may be over HTTPS or supported through VPN. Alternatively, there may be a direct link between the client and the server if another authentication means is employed.

Next, the server responds 1106 to the received request with an authentication response. Depending on implementation, such response may be a dialog box to be displayed on the screen of the client machine, a command or other demand. In any case, the response requires that credential information be provided by the user. As described before, the credential information may be a set of username and password or biometric information of the user and must be received from the user. A decision 1108 then causes the authentication processing 1100 to await for such credential information before the authentication processing 1100 may proceed. Upon receiving the credential information, a decision 1110 determines whether the user is authenticated. Here, the decision 1110 can determines whether the user is authenticated to access any secured files. If the decision 1110 determines that the user is not authenticated, the authentication processing 1110 goes back to the beginning of the authentication processing 1100 to continue waiting for a request. In other words, the current request to access the secured documents or login to the system is abandoned. If the decision 1110 determines that the user is authenticated, the user is then recognized as being authentic. At the same time, the client machine can undergo a similar authentication by, perhaps, an IP address thereof, or a network card identification therein, or other means that uniquely identifies the client machine.

After authentication of both the user and the client machine, the user's access privilege is activated 1112. Depending on implementation, an activation of the user's access privilege may be a downloading of a file containing the access privilege to the client machine, a decryption of a local file containing the access privilege, or simply an activation of the user in a memory space of the server. In any case, at this point, the user's access privilege(s) is readily accessible, thus permitting the user to access the secured documents from the authenticated client machine.

As described above, according to one embodiment, the secured document includes two encrypted portions, the header with encrypted security information and the encrypted data portion (i.e., the encrypted document). The two parts in the secured document are encrypted respectively with two different keys, the file key and the user key. Alternatively, the two encrypted portions may be encrypted again with another key (or use the same user key).

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape, and optical data storage devices. Examples of transmission media include carrier waves. The tangible computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that public keys and identifiers therefore are used to encrypt files are not generated prior to protection. Consequently, the system does not need to generate keys in advance and then store and distribute them, and deal with the difficulties of key revocation and key rotation. Another advantage of the invention is that the public keys indirectly identify rules that provide access restrictions. The rules (access rules) are also used to generate the private keys, which protects the rules from being modified. Still another advantage of the invention is that centralized management of access rules is facilitated.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A computer-implemented method for securing a file, the method comprising:
    obtaining, by a computing device, seed information associated with a master key that has been previously generated;
    regenerating the master key using the seed information;
    producing a rules string in accordance with access rules and access privileges to be imposed;
    producing, using the master key, a private key based on the access rules;
    storing the rules string in a central location;
    obtaining an identifier for the rules string, wherein the identifier is a public key;
    encrypting a file key with the public key;
    encrypting at least a key block portion of the file using the private key; and
    encrypting at least a data portion of the file using the encrypted file key.

2. The computer-implemented method as recited in claim 1, wherein producing a rules string includes using access rules that limit user access to the file once it has been encrypted, and wherein producing a rules string includes specifying access privileges that restrict user actions permitted to be performed with the file.

3. The computer-implemented method as recited in claim 1, further comprising defining the access rules and access privileges using a markup language.

4. The computer-implemented method as recited in claim 1, wherein producing a rules string in accordance with access rules includes producing a textual indication of who access the file and when they are permitted to access the file.

5. The computer-implemented method as recited in claim 4, wherein producing a rules string in accordance with access rules further comprises producing a textual indication of how to access the file.

6. The computer-implemented method as recited in claim 4, wherein producing a rules string in accordance with access rules further comprises producing a textual indication of from where to access the file.

7. The computer-implemented method as recited in claim 4, further comprising providing the textual indication using a markup language.

8. The computer-implemented method as recited in claim 1, wherein producing a rules string in accordance with access rules includes producing a rules string in accordance with at least one access rule that expires on predetermined conditions.

9. The computer-implemented method as recited in claim 1, wherein producing a rules string in accordance with access rules includes producing a rules string in accordance with at least one access rule that specifies one or more of data types, group users or individual users, applicable rights, or duration of access rules.

10. The computer-implemented method as recited in claim 1, wherein producing a rules string in accordance with access rules includes producing a rules string in accordance with at least one access rule that specify a policy.

11. The computer-implemented method as recited in claim 1, wherein encrypting a file key includes encrypting a symmetric key.

12. The computer-implemented method as recited in claim 1, wherein obtaining an identifier includes obtaining a unique identifier for the rules string.

13. The computer-implemented method as recited in claim 1, wherein producing a rules string in accordance with access rules includes producing a rules string in accordance with access rules that limit user access to the file once it has been encrypted, and wherein the access rules comprise a textual indication of at least two or more of:
    who is permitted to access the file, when they are permitted to access the file, how to access the file can be accessed, and where to access the file.

14. A computer-implemented method for decrypting a secured file that has been previously encrypted, the method comprising:
    obtaining, by a computing device, seed information associated with a master key that has been previously generated;
    regenerating the master key using the seed information;
    obtaining an identifier for a rules string associated with the secured file to be decrypted, wherein the identifier is a public key;
    obtaining the rules string associated with the identifier;
    identifying access rules and access privileges associated with the rules string;
    evaluating the access rules and access privileges to determine whether a user requesting access to the secured file is permitted access to the secured file;
    generating a private key based on the access rules and the master key; and
    decrypting, using the private key, at least a portion of the secured file.

15. The computer-implemented method as recited in claim 14, wherein the decrypting comprises:

decrypting a key file associated with the secured file using the private key; and decrypting at least a portion of the secured file using the file key.

16. The computer-implemented method as recited in claim 15, wherein decrypting at least a portion of the secured file includes decrypting a data portion of the secured file.

17. A data storage device having computer program code stored thereon, that when read and executed by a processor, causes the data storage device to encrypt a file by a method, the method comprising:

obtaining seed information associated with a master key that has been previously generated;

regenerating the master key using the seed information;

producing a rules string in accordance with access rules and access privileges to be imposed;

producing, using the master key, a private key based on the access rules;

obtaining an identifier for the rules string, wherein the identifier is a public key;

encrypting at least a key block portion of the file using the private key; and encrypting at least a data portion of the file using the public key or other key encrypted with the public key.

18. The data storage device as recited in claim 17, wherein the encrypting at least the data portion comprises:

obtaining the other key;

encrypting the other key with the public key; and encrypting at least a portion of the file using the encrypted other key.

19. The data storage device as recited in claim 18, wherein the obtaining the other key includes obtaining a file key.

20. The data storage device as recited in claim 17, wherein producing a rules string in accordance with access rules includes producing a rules string in accordance with access rules that limit user access to the file once it has been encrypted, and includes producing a rules string in accordance with access privileges that restrict user actions permitted with the file.

21. The data storage device as recited in claim 17, further comprising defining the access rules and access privileges using a markup language.

22. The data storage device as recited in claim 17, wherein producing a rules string in accordance with access rules includes producing a rules string in accordance with access rules that specify one or more of data types, group users or individual users, applicable rights, or duration of access rules.

23. The data storage device as recited in claim 17, wherein obtaining an identifier includes obtaining a unique identifier for the rules string.

24. The data storage device as recited in claim 17, wherein producing a rules string in accordance with access rules includes producing a rules string in accordance with access rules that limit user access to the file once it has been encrypted, and wherein producing a rules string in accordance with access rules includes producing a rules string that comprises a textual indication of at least two or more of: who is permitted to access the file, when they are permitted to access to access the file, how the file, or from where to access the file.

25. A computer readable storage device having instructions stored thereon for decrypting a secured file, wherein the secured file has been previously encrypted, the instructions comprising:

instructions to obtain seed information associated with a master key that has been previously generated;

instructions to regenerate the master key using the seed information;

instructions to obtain an identifier for a rules string associated with the secured file to be decrypted, wherein the identifier is a public key;

instructions to obtain the rules string associated with the identifier;

instructions to identify access rules and access privileges associated with the rules string;

instructions to evaluate the access rules and access privileges to determine whether a user requesting access to the secured file is permitted access to the secured file;

instructions to generate a private key based on the access rules and the master key; and instructions to decrypt, using the private key, at least a portion of the secured file.

26. The computer readable storage device as recited in claim 25, wherein the instructions to decrypt comprise:

instructions to decrypt a file key associated with the secured file using the private key; and instructions to decrypt at least a portion of the secured file using the file key.

27. The computer readable storage device as recited in claim 26, wherein the instructions to decrypt comprise instructions to decrypt a data portion of the secured file.

28. A non-transitory computer readable storage medium having instructions stored thereon, the instructions comprising:

instructions to obtain seed information associated with a master key that has been previously generated;

instructions to regenerate the master key using the seed information;

instructions to produce a rules string in accordance with access rules and access privileges to be imposed;

instructions to produce, using the master key, a private key based on the access rules;

instructions to obtain an identifier for the rules string, wherein the identifier is a public key;

instructions to obtain a key block of the file to be encrypted, the file including at least the key block and a data block;

instructions to encrypt the key block portion of the file using the private key; and instructions to encrypt the data block portion of the file using the public key or other key encrypted with the public key.

29. A non-transitory computer readable storage medium having instructions stored for decrypting a secured file, wherein the secured file has been previously encrypted, the instructions comprising:

instructions to obtain seed information associated with a master key that has been previously generated;

instructions to regenerate the master key using the seed information;

instructions to obtain an identifier for a rules string associated with the secured file to be decrypted, wherein the identifier is a public key;

instructions to obtain the rules string associated with the identifier;

instructions to identify access rules and access privileges associated with the rules string; and instructions to evaluate the access rules and access privileges to determine whether a user requesting access to the secured file is permitted access to the secured file;

instructions to generate a private key based on the access rules and a master key;

instructions to obtain an encrypted key block of the secured file;

instructions to decrypt, using the private key, the encrypted key block to obtain a file key; and instructions to decrypt at least a portion of the secured file for access thereto by the user through use of the file key.

30. The tangible non-transitory computer readable storage medium as recited in claim 29, wherein the portion of the secured file being decrypted is a data portion of the secured file.

31. A file security system, comprising:

a server including at least an access manager module configured to evaluate access rules and access privileges to limit access to files protected by said file security system; and a rules string database to operatively connect to the server, the rules string database storing a plurality of different rules strings in a computer readable medium, wherein upon decrypting a previously secured file, the access manager module includes a configuration to retrieve a particular rules string from the rules string database, wherein the particular rules string to be retrieved is dependent on an identifier provided in a secured file, wherein the identifier is a public key, wherein the access manager module includes a configuration to evaluate the particular rules string to determine whether access rules associated with the particular rules string are satisfied, and then in response to determining that the access rules are satisfied, the access manager module includes a configuration to obtain seed information associated with a master key that has been previously generated, regenerate the master key using the seed information, and thereafter the master key is used to generate a private key based on the access rules string, and thereafter the private key is used to decrypt at least a portion of the secured file.

32. The file security system as recited in claim 31, wherein the identifier uniquely points to the particular rules string.

33. The computer-implemented method as recited in claim 14, further comprising:

denying access to the secured file in response to determining that the access rules do not permit the user to access the secured file; and denying actions to be performed with the secured file in response to determining that the access privileges do not permit the user to perform a requested action with the secured file.

34. The computer-implemented method as recited in claim 14, comprising wherein the decrypting comprises:

in response to determining that the access rules permit the user to access the secured file, decrypting, using the private key, of the secured file for access thereto by the user.

35. The computer readable storage device as recited in claim 25, the instructions further comprising:

instructions to deny access to the secured file when said evaluating determines that the access rules do not permit the user to access the secured file; and instructions to deny actions to be performed with the secured file when the evaluating determines that the access privileges do not permit the user to perform a requested action with the secured file.

36. The computer readable storage device as recited in claim 25, the instructions further comprising:

instructions to decrypt, using the private key, in response to determining that the access rules permit the user to access the secured file, the secured file for access thereto by the user.

37. The non-transitory computer readable storage medium as recited in claim 29, the instructions further comprising:

instructions to deny access to the secured file in response to determining that the access rules do not permit the user to access the secured file;

instructions to deny actions to be performed with the secured file in response to determining that the access privileges do not permit the user to perform a requested action with the secured file.

38. The non-transitory computer readable storage medium as recited in claim 29, the instructions to decrypt further comprising:

instructions to decrypt, using the private key, in response to determining that the access permit the user to access the secured file, the encrypted key block to obtain a file key; and instructions to decrypt, through use of the file key, in response to determining that the access rules permit the user to access the secured file, at the secured file for access thereto by the user.

* * * * *

UNITED STATES PATENT AND TRADEMARK OFFICE
CERTIFICATE OF CORRECTION

PATENT NO.         : 7,921,450 B1
APPLICATION NO.    : 10/295363
DATED              : April 5, 2011
INVENTOR(S)        : Vainstein et al.

It is certified that error appears in the above-identified patent and that said Letters Patent is hereby corrected as shown below:

Page 4, item (56), under "U.S. Patent Documents", in Column 2, Line 49, below "2002/0062451 A1 5/2002 Scheidt et al." insert -- 2002/0069077 A1 6/2002 Brophy et al. --.

Page 4, item (56), under "U.S. Patent Documents", in Column 2, Line 55, below "2002/0078361 A1 6/2002 Giroux et al." insert -- 2002/0087479 A1 7/2002 Malcolm --.

Page 4, item (56), under "U.S. Patent Documents", in Column 2, Line 70, below "2002/0138726 A1 9/2002 Samson et al." insert -- 2002/0138762 A1 9/2002 Horne --.

Page 4, item (56), under "U.S. Patent Documents", in Column 2, Line 74, below "2002/0152302 A1 10/2002 Motoyama et al." insert -- 2002/0156726 A1 10/2002 Kleckner et al. --.

Page 4, item (56), under "U.S. Patent Documents", in Column 2, Line 78, below "2002/0166053 A1 11/2002 Wilson" insert -- 2002/0169963 A1 11/2002 Seder et al. --.

Page 5, item (56), under "U.S. Patent Documents", in Column 1, Line 2, below "2002/0174030 A1 11/2002 Praisner et al." insert -- 2002/0174109 A1 11/2002 Chandy et al. --.

Page 5, item (56), under "U.S. Patent Documents", in Column 1, Line 4, below "2002/0176572 A1 11/2002 Ananth" insert -- 2002/0178271 A1 11/2002 Graham et al. --.

Page 5, item (56), under "U.S. Patent Documents", in Column 1, Line 9, below "2003/0005168 A1 1/2003 Leerssen et al." insert -- 2003/0009685 A1 1/2003 Choo et al. --.

Page 5, item (56), under "U.S. Patent Documents", in Column 1, Line 10, below "2003/0014391 A1 1/2003 Evans et al." insert -- 2003/0023559 A1 1/2003 Choi et al. --.

Page 5, item (56), under "U.S. Patent Documents", in Column 1, Line 16, below "2003/0037237 A1 2/2003 Abgrall et al." insert -- 2003/0037253 A1 2/2003 Blank et al. --.

Signed and Sealed this
Eleventh Day of October, 2011

David J. Kappos
*Director of the United States Patent and Trademark Office*

CERTIFICATE OF CORRECTION (continued)
U.S. Pat. No. 7,921,450 B1

Page 5, item (56), under "U.S. Patent Documents", in Column 1, Line 23, below "2003/0061506 A1 3/2003 Cooper" insert -- 2003/0074580 A1 4/2003 Knouse et al.
2003/0078959 A1 4/2003 Yeung et al.
2003/0079175 A1 4/2003 Limantsev --.

Page 5, item (56), under "U.S. Patent Documents", in Column 1, Line 26, below "2003/0081787 A1 5/2003 Kallahalla et al." insert -- 2003/0088517 A1 5/2003 Medoff --.

Page 5, item (56), under "U.S. Patent Documents", in Column 1, Line 30, below "2003/0101072 A1 5/2003 Dick et al." insert -- 2003/0110169 A1 6/2003 Zuili --.

Page 5, item (56), under "U.S. Patent Documents", in Column 1, Line 55, below "2003/0197729 A1 10/2003 Denoue et al." insert -- 2003/0200202 A1 10/2003 Hsiao et al. --.

Page 6, item (56), under "Other Publications", in Column 2, Lines 16-17, delete "idnetifying compunds" and insert -- identifying compounds --.

Page 7, item (56), under "Other Publications", in Column 2, Line 24, below "Office Action, dated Oct. 5, 2005, for European Patent Application No. 02258532.7, 5 pgs." insert -- Office Action, dated Dec. 5, 2006, for European Patent Application No. 02258532.7, 5 pgs. --.

Column 29, lines 59-60, in Claim 24, delete "to access to access" and insert -- to access --.

Column 31, line 5, in Claim 30, delete "The tangible non-transitory" and insert -- The non-transitory --.

Column 32, line 40, in Claim 38, delete "file, at the" and insert -- file, the --.